(12) United States Patent
Moscovitch

(10) Patent No.: US 9,164,538 B2
(45) Date of Patent: *Oct. 20, 2015

(54) GRAPHICS AND MONITOR CONTROLLER ASSEMBLIES IN MULTI-SCREEN DISPLAY SYSTEMS

(71) Applicant: Jerry Moscovitch, Toronto (CA)

(72) Inventor: Jerry Moscovitch, Toronto (CA)

(*) Notice: Subject to any disclaimer, the term of this patent is extended or adjusted under 35 U.S.C. 154(b) by 123 days.

This patent is subject to a terminal disclaimer.

(21) Appl. No.: 13/958,229

(22) Filed: Aug. 2, 2013

(65) Prior Publication Data

US 2013/0314300 A1 Nov. 28, 2013

Related U.S. Application Data

(63) Continuation-in-part of application No. 12/652,521, filed on Jan. 5, 2010, now abandoned, which is a continuation of application No. 11/415,311, filed on May 2, 2006, now Pat. No. 7,652,876, which is a continuation-in-part of application No. 10/170,826, filed on Jun. 13, 2002, now Pat. No. 7,061,754.

(60) Provisional application No. 60/597,045, filed on Nov. 7, 2005.

(51) Int. Cl.
| G06F 1/16 | (2006.01) |
|---|---|
| G06F 3/14 | (2006.01) |
| F16M 11/04 | (2006.01) |
| F16M 11/14 | (2006.01) |
| F16M 11/20 | (2006.01) |
| F16M 11/24 | (2006.01) |
| G09G 5/00 | (2006.01) |

(52) U.S. Cl.
CPC .............. *G06F 1/1601* (2013.01); *F16M 11/04* (2013.01); *F16M 11/14* (2013.01); *F16M 11/2085* (2013.01); *F16M 11/24* (2013.01); *G06F 3/1431* (2013.01); *G06F 3/1438* (2013.01); *F16M 2200/022* (2013.01); *F16M 2200/065* (2013.01); *F16M 2200/08* (2013.01); *G09G 5/003* (2013.01); *G09G 2370/04* (2013.01)

(58) Field of Classification Search
USPC ........... 361/679.21, 679.22; 345/1.3; 248/917
See application file for complete search history.

(56) References Cited

U.S. PATENT DOCUMENTS

| 5,488,385 | A | | 1/1996 | Singhal | |
|---|---|---|---|---|---|
| 5,680,820 | A | * | 10/1997 | Randolph | ........................ 108/25 |
| 5,687,939 | A | * | 11/1997 | Moscovitch | ................ 248/122.1 |
| 5,904,328 | A | * | 5/1999 | Leveridge et al. | .......... 248/124.1 |
| 5,948,092 | A | * | 9/1999 | Crump et al. | .................. 710/300 |

(Continued)

OTHER PUBLICATIONS

Canadian Office Action (dated: Jan. 3, 2012); Appln. No. 2,634,827; Jerry Moscovitch (inventor).

(Continued)

*Primary Examiner* — Adrian S Wilson

(57) ABSTRACT

A multi-monitor display system is described having an arm adapted for supporting a plurality of monitors containing display screens. The system also includes a column for supporting the arm, a monitor controller assembly for electronically controlling images displayed on the screens, and a graphics assembly for sending signals to the monitor controller assembly to produce the images. The system is used in conjunction with a central processor located in a computer housing. The monitor controller assembly is disposed outside of the monitors and/or the graphics assembly is disposed outside the computer housing.

13 Claims, 19 Drawing Sheets

(56) References Cited

U.S. PATENT DOCUMENTS

| | | | |
|---|---|---|---|
| 6,043,797 | A | 3/2000 | Clifton et al. |
| 6,151,401 | A * | 11/2000 | Annaratone ................. 381/388 |
| 6,188,569 | B1 * | 2/2001 | Minemoto et al. ....... 361/679.33 |
| 6,222,507 | B1 * | 4/2001 | Gouko ........................... 345/1.1 |
| D448,023 | S * | 9/2001 | Kim ............................. D14/337 |
| D448,370 | S * | 9/2001 | Kim ............................. D14/337 |
| 6,341,061 | B1 * | 1/2002 | Eisbach et al. ........... 361/679.46 |
| 6,366,453 | B1 * | 4/2002 | Wang et al. .............. 361/679.06 |
| 6,430,038 | B1 * | 8/2002 | Helot et al. .............. 361/679.05 |
| 6,532,146 | B1 * | 3/2003 | Duquette ................. 361/679.04 |
| 6,690,337 | B1 * | 2/2004 | Mayer et al. ................... 345/1.1 |
| 6,870,518 | B1 * | 3/2005 | Brenner ........................ 345/1.3 |
| 7,058,891 | B2 | 6/2006 | O'Neal et al. |
| 7,061,754 | B2 * | 6/2006 | Moscovitch ............. 361/679.21 |
| 7,140,034 | B2 * | 11/2006 | Kamei et al. .................. 725/153 |
| 7,331,551 | B2 | 2/2008 | Oddsen, Jr. |
| 7,652,876 | B2 * | 1/2010 | Moscovitch ............. 361/679.22 |
| 8,922,457 | B2 * | 12/2014 | Moscovitch ................... 345/1.1 |
| 2001/0011965 | A1 * | 8/2001 | Wilks ............................. 345/1.1 |
| 2002/0199047 | A1 * | 12/2002 | DuPont et al. ................. 710/100 |
| 2003/0086240 | A1 * | 5/2003 | Jobs et al. ..................... 361/683 |
| 2004/0080482 | A1 * | 4/2004 | Magendanz et al. .......... 345/100 |
| 2007/0076006 | A1 * | 4/2007 | Knepper et al. ............... 345/520 |
| 2015/0109312 | A1 | 4/2015 | Moscovitch |

OTHER PUBLICATIONS

Busby and 7000-8408-Busby Brochures; Innovative Office Products (www.lcdarms.com); one brochure recites "product innovations 2013"; brochures downloaded May 13, 2015.

* cited by examiner

GRAPHICS AND MONITOR CONTROLLER ASSEMBLIES IN MULTI-SCREEN DISPLAY SYSTEMS

CROSS REFERENCE TO RELATED APPLICATIONS

This application is a continuation-in-part of U.S. application Ser. No. 12/652,521 filed Jan. 5, 2010, which is a continuation of U.S. application Ser. No. 11/415,311 filed May 2, 2006, which is a continuation-in-part of U.S. application Ser. No. 10/170,826 filed Jun. 13, 2002 and also claims priority to U.S. provisional application No. 60/597,045 filed on Nov. 7, 2005.

FIELD OF THE INVENTION

The present invention generally pertains to computer systems, and more particularly to graphics and monitor controller assemblies in multi-screen display systems.

BACKGROUND OF THE INVENTION

With present day computer systems, the configuration of the system is often limited and does not provide for much flexibility in terms of being able to mix and match peripherals. This is especially so for the display portion of the system. With systems employing a liquid crystal display (LCD) screen, there is often no means for easily attaching additional LCD screens, or for reconfiguring two or more existing screens, or for allowing easy and quick removal and/or replacement of one of more LCD screens of different sizes.

Another disadvantage with present day computer systems is the large number of electrical cables that must be used to couple the CPU with the peripherals. This is especially so when two or more LCD screens are used. Each LCD screen requires its own data cable and power cable, so, for example, a three LCD screen system would require, for example, six cables to be coupled to the LCD screens. As will be appreciated, these cables significantly clutter the user's work area. When power and data cables from additional peripherals such as DVDs, ZIP drives, etc, are added, the collection of cables can significantly interfere with the work space of the user.

One further disadvantage that acts as a barrier to the widespread use of multi-screen display systems is the large size and weight of such systems. With the number of monitors per display system reaching four, six or even greater, the weight and size of the display system can become unwieldy.

Another barrier arises when a user of a single-monitor computer system wishes to upgrade to a multi-monitor system. In addition to acquiring the additional monitors for the upgrade, the user typically also has to replace the single-monitor graphics card in the computer system with a multi-monitor graphics card. Such a replacement is time consuming and can be costly if the user enlists the help of a technician to replace the graphics card.

In view of these drawbacks, it would be highly desirable to provide a modular computer system which allows one or more LCD screens to be used, according to the user's needs, and which permits easy adding or removal of LCD screens without significant and time consuming disassembly steps being required.

Just as importantly, it would be desirable to provide a computer system which includes a support structure capable of housing the power and data cables needed for coupling the LCD screens and peripherals making up the system to the CPU. In this manner, the large number of data and power cables could be maintained out of the user's sight and out of the user's immediate work area.

Further, any innovation that can reduce the weight and size of multi-monitor computer systems, and that can obviate the need to replace a graphics card in the computer to achieve multi-monitor functionality is desirable.

SUMMARY OF THE INVENTION

In one preferred form the present invention provides a display screen support system which functions to support one or more video display screens, as well as to house a computer system and related electrical and power cabling. In one preferred form the display screens comprise liquid crystal display (LCD) screens. The screen support system includes a support, which in one preferred form comprise a base, having a central processing unit interface portion for selectively interconnecting with a central processing unit housed within the base. A column extends upwardly from the base. A laterally extending arm includes an engagement portion for selectively coupling to a complimentary engagement portion disposed in the column. At least one bracket is coupled to the arm and is operable to slidably traverse the arm. The bracket is configured to couple with an associated LCD screen.

The present invention thus makes use of the structure that would ordinarily just be used to support the LCD screen(s) to also house the central processing unit (CPU), one or more power supplies, and various cables typically used to couple the LCD screen(s) with the CPU and also to provide power to the LCSs and other electronic components of the system. In this manner the numerous cables and power supplies that would typically be present on and around a user's work area are all hidden within the LCD support system. This makes for a very organized and aesthetically appealing support structure.

Also described herein is a multi-monitor display system for use with a central processor disposed within a computer housing. The system further includes an arm adapted for supporting a plurality of monitors having display screens, and a column for supporting the arm. The system further includes a monitor controller assembly for electronically controlling images displayed on the screens, and a graphics assembly for sending signals to the monitor controller assembly to produce the images, wherein the monitor controller assembly is disposed outside of the monitors. The graphics assembly is disposed outside of the computer housing. Instead, or in addition, the monitor controller assembly is disposed outside of the monitors.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With initial reference to FIGS. 1 through 4, a support system 10 in accordance with a preferred embodiment of the present invention is shown. In one preferred form the support system 10 forms an LCD support system, and will be referred throughout herein as such. The LCD support system 10 includes a support forming a base 12 having a central processing unit (CPU) interface portion 14 and a generally upright column 20 extending therefrom.

Figure 1:
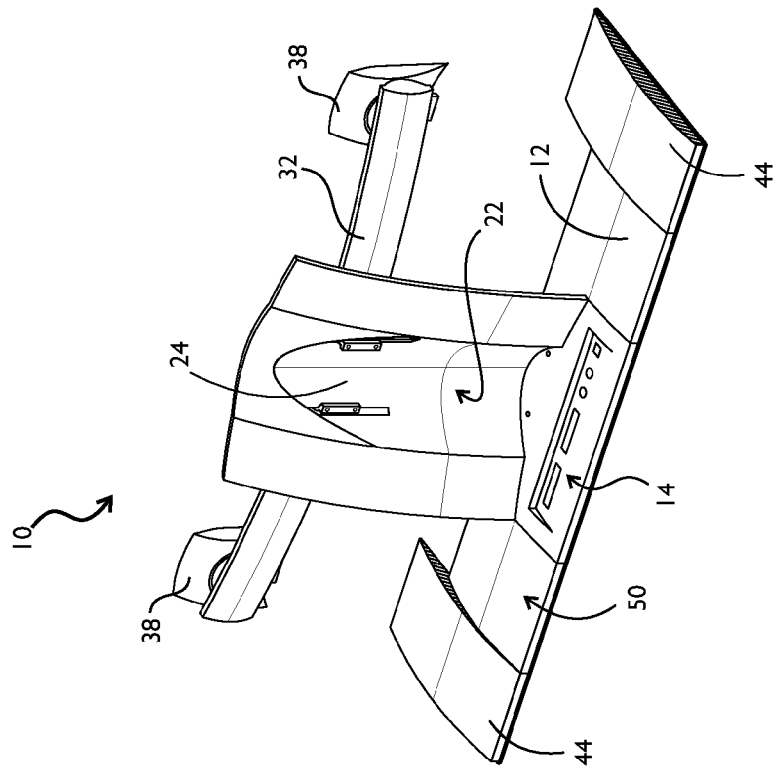
FIG. 1 is a rear perspective view of the computer system according to a first embodiment shown with the dual arm in the installed portion.

A central portion 22 of the upright column 20 includes a mounting post 24 for slidably accepting a mounting bracket 30 (FIG. 2) extending from a dual arm LCD support 32. The dual arm 32 extends generally parallel to base 12 and perpendicular to column 20 in a mounted position (FIG. 1). Slider brackets 28 (FIGS. 3 and 4), as will be described later in greater detail, include a first portion coupled for slidable engagement with dual arm 32 and a second portion configured for engaging a pivot bracket 38 coupled to an LCD viewing screen. A cover 40 (FIG. 3) includes ears 42 extending from opposite ends thereof for engaging complimentary slots (not specifically shown) incorporated along opposite sides of the central portion 22. The cover 40 encloses the mounting post 24 and bracket 30 connection and creates a more uniform surface across the upper portion of column 20.

With continued reference to FIGS. 1 through 4, base 12 will now be described in greater detail. It will be appreciated that the base 12 could take a variety of shapes and/or configurations. Accordingly, the illustration of the base 12 as a laterally extending component is merely for exemplary purposes. Base 12 includes a generally longitudinal central portion 50 having selectively removable foot portions 44 transversely extending on opposite ends thereof. The foot portions 44 may comprise non operative structural members (FIG. 1) or alternatively comprise working peripherals 46, 48 (FIG. 2) such as a digital video disk (DVD) or a compact disk readable writable (CDRW) module for example. In addition, one or both of the foot portions may include an alternative data storage drive such as a secondary hard drive or ZIP drive. The foot portions 44, 46 and 48 include pins and receivers configured on inboard surfaces thereof (not specifically shown) for mating with complimentary pins and receivers configured on outboard edge surfaces (not specifically shown) of central portion 50 for easy "plug and play" capability. CPU interface portion 14 is centrally configured along central portion 50 and, as with foot portions 46, 48, includes pins and receivers for complimentarily mating with pins and receivers disposed on CPU 100 (FIG. 7) for easy "plug and play" capability. In this regard, CPU 100 (FIG. 4) may be easily detached from LCD support system 10 and relocated to a second computer system. As such, the portability allows the user to move from a first computer system configuration to an alternative computer system configuration which may employ different amounts of viewing screens having alternate orientations as will be discussed in the alternate embodiments herein. Also importantly, the inclusion of the CPU interface portion 14 in the base 12 eliminates the need for electrical cabling to be used exteriorly of the system 10, which would clutter the user's work area. Likewise the attachment of working peripherals 46, 48 eliminates the need for external electrical cabling to connect with the CPU interface 14. This further helps to provide a very uncluttered work area around the LCD support system 10. In one preferred form the base 12 also houses the power supplies needed for powering one or more LCD screens.

Figure 2:
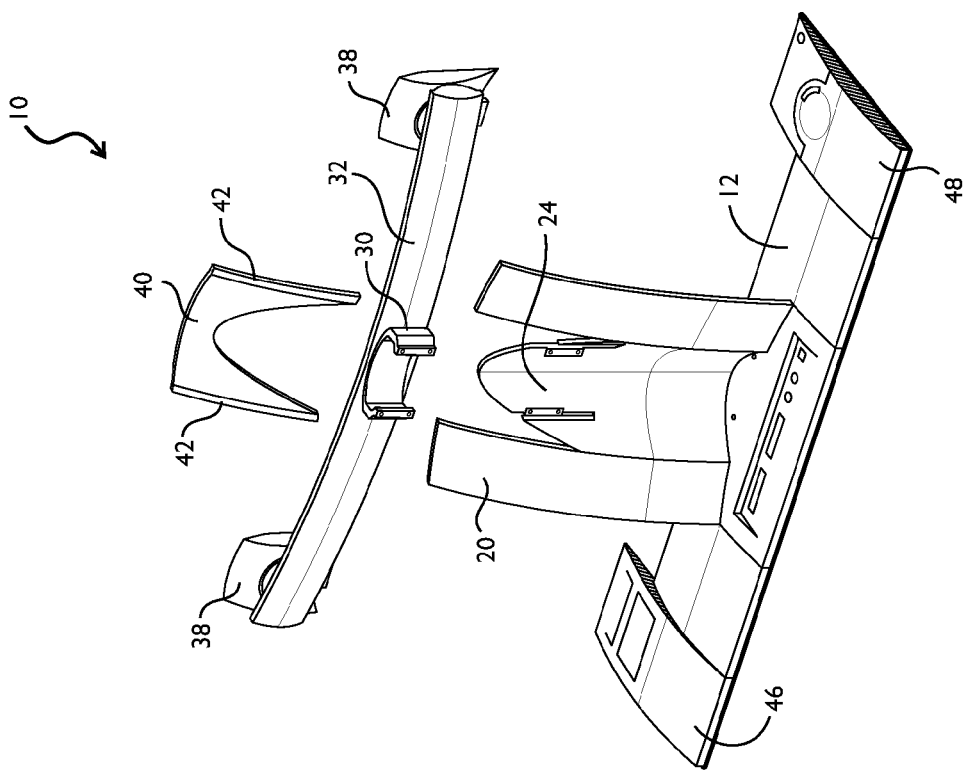
FIG. 2 is a rear perspective view of the computer system according to a first embodiment shown with the dual arm and cover detached from the computer system as well as engaged working peripherals.
Figure 4:
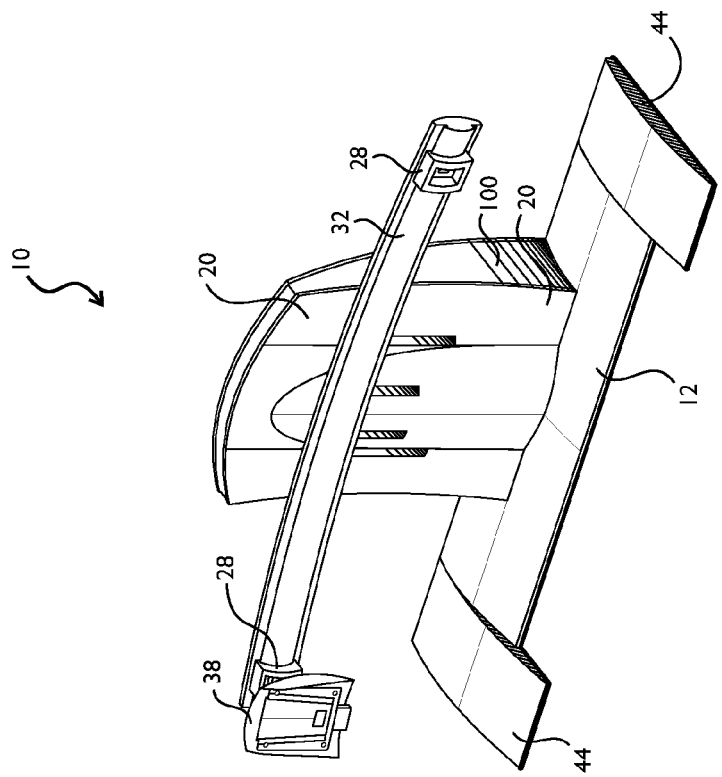
FIG. 4 is a front perspective view of the computer system of FIG. 1.
Figure 3:
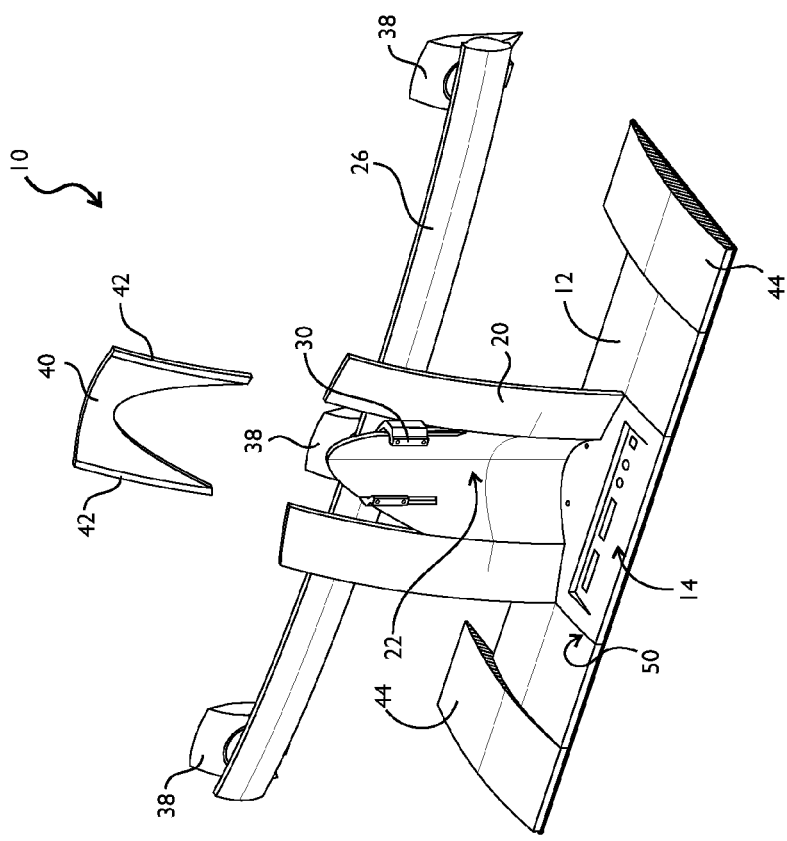
FIG. 3 is a view of the computer system of FIG. 1 shown with the cover removed for illustration.

As shown in FIGS. 1, 2 and 4, LCD support system 10 includes two slider brackets 38 arranged on opposite ends of dual arm 32. FIG. 3 is shown having a third slider bracket 38 centrally located along extended dual arm 26. Dual arm 26 has a horizontal span sufficient to accommodate three adjacent LCD screens.

Figure 5:
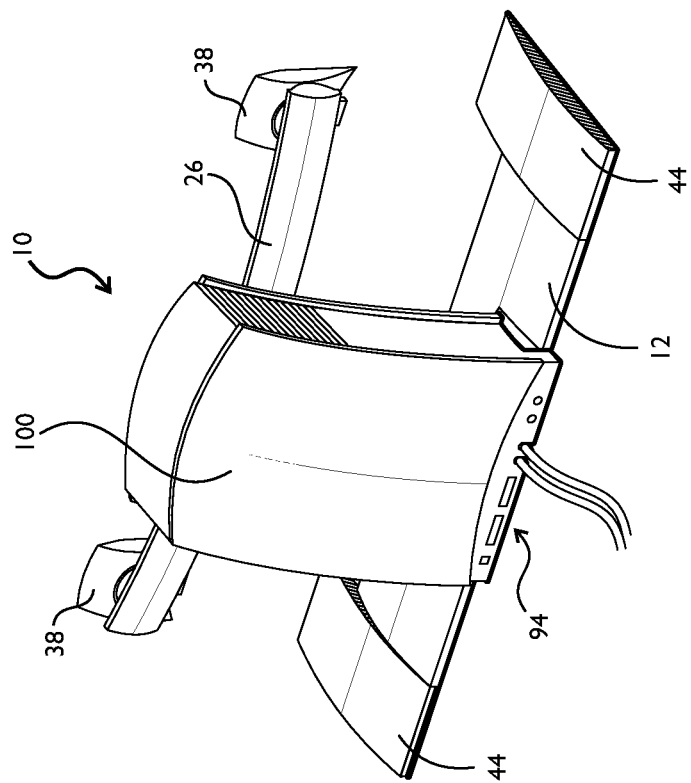
FIG. 5 is a rear perspective view of the computer system of FIG. 1 shown with a central processing unit in an installed position.
Figure 6:
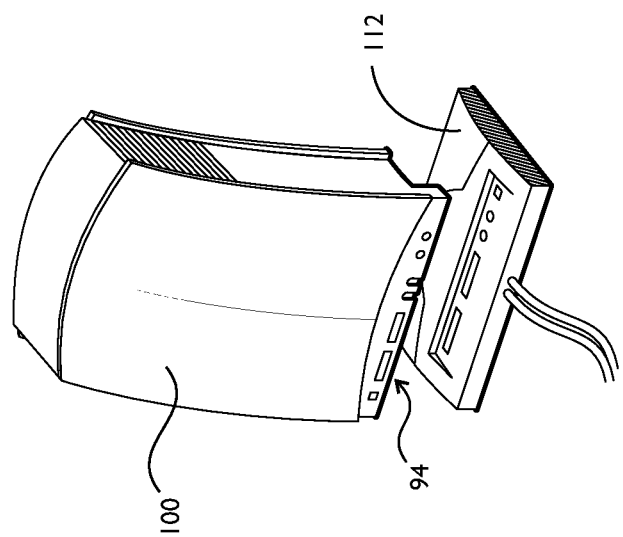
FIG. 6 is a rear perspective view of a central processing unit and a standalone base shown in an uninstalled position.
Figure 7:
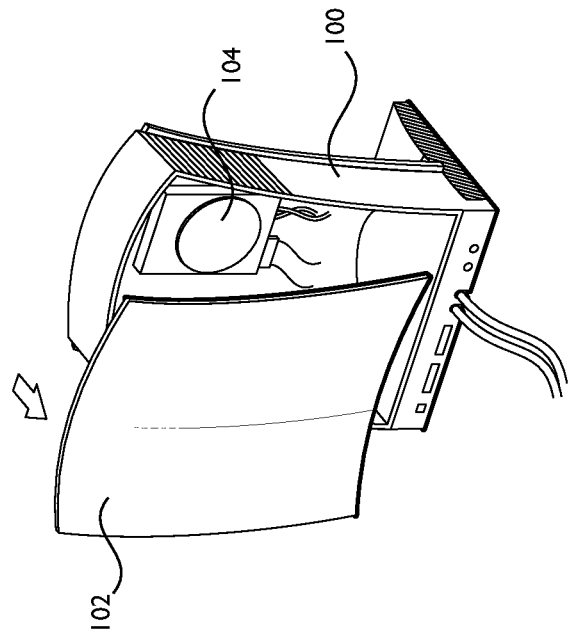
FIG. 7 is a perspective view of the central processing unit installed to the standalone base shown with the door partially opened.

Referencing now FIG. 5 the LCD support system 10 according to the first embodiment is shown with CPU 100 in an installed or docked position. CPU 100 includes vertically oriented connection ports 94 for suitably interfacing with an external pointing device, keyboard and the like. FIG. 6 illustrates an alternative configuration wherein a standalone base unit 112 is provided. The standalone base unit 112 may be used when viewing multiple screens is not required. While not specifically shown, a dual connection port arrangement may also be employed in a side-by-side relationship such that two CPU units 100 may be concurrently docked. Such a setup would provide further memory or processing capability when additional computing resources are desired. In each scenario, the pins and receivers incorporated on the CPU interface portion 14 are configured to mate with complimentary pins and receivers (not specifically shown) disposed on a bottom face of the CPU. As shown in FIG. 7, CPU 100 includes a hingedly attached door 102 for easy access to hard drive 104.

Figure 9:
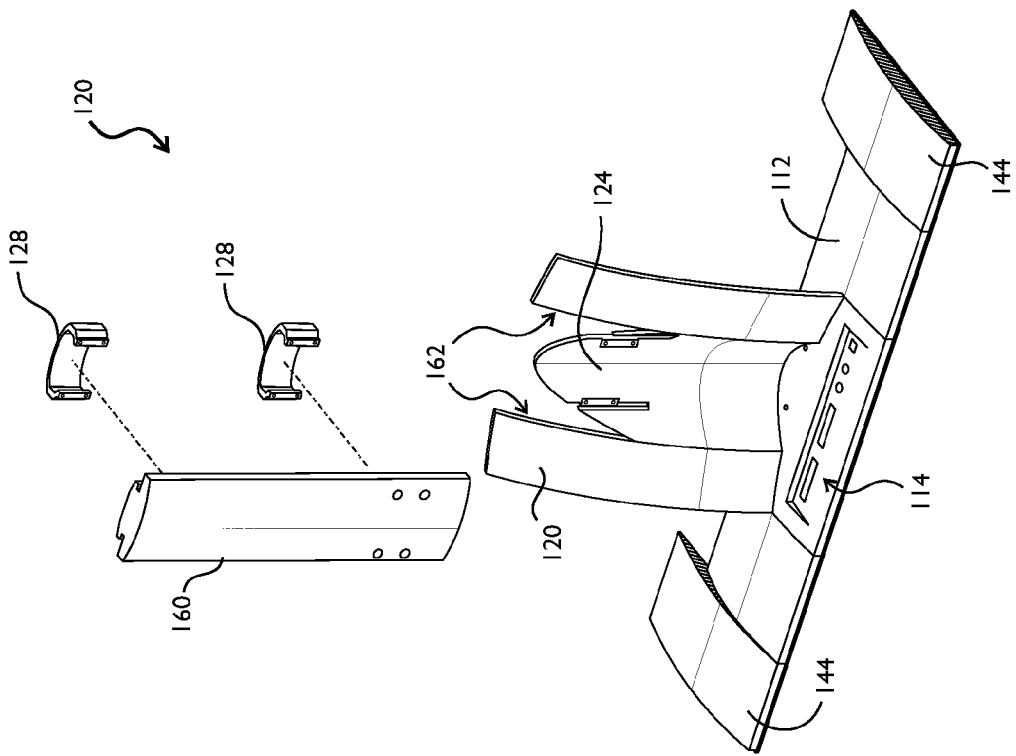
FIG. 9 is a rear perspective view of the computer system of FIG. 8 shown with the vertical arm and slider brackets in an uninstalled position.
Figure 8:
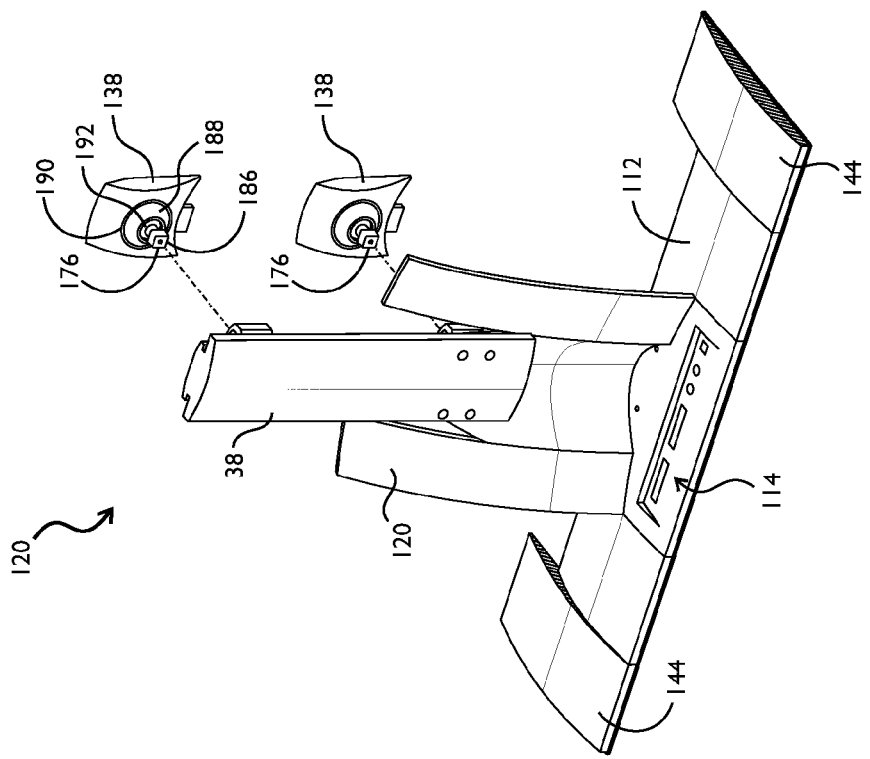
FIG. 8 is a rear perspective view of the computer system according to a second embodiment.
Figure 10:
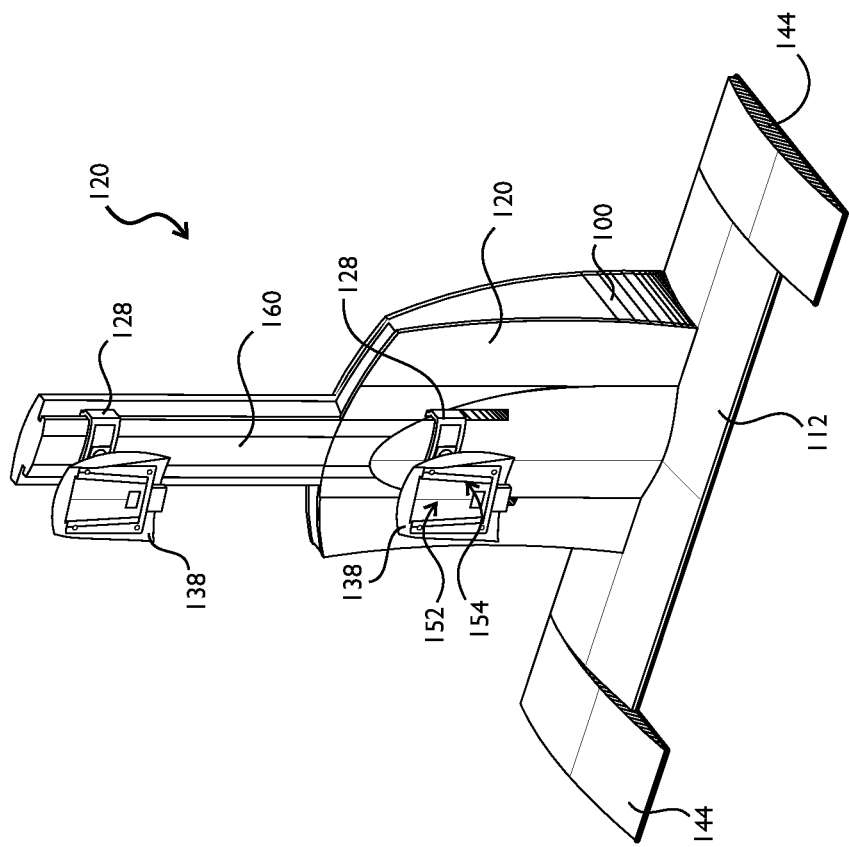
FIG. 10 is a front perspective view of the computer system of FIG. 8.

Turning now to FIGS. 8-10, the present invention will be described according to a second embodiment wherein like reference numbers increased by 100 will be used to designate components corresponding to system 10. In this regard, LCD support system 120 includes base 112 shown in cooperative engagement with vertical arm 160. A pair of grooves (not specifically shown) are arranged along opposing inner walls 162 of column 120 to interface with a pair of tongues 164 extending along opposite sides of the arm 160. First and second slider brackets 128 are coupled for slidable engagement with vertical arm 160. First and second pivot brackets 138 selectively couple to first and second slider brackets 128 to provide pivotal movement for a mounted LCD viewing screen. Such a configuration provides for first and second LCD screens to be adjacently mounted in a vertical orientation.

Figure 11:
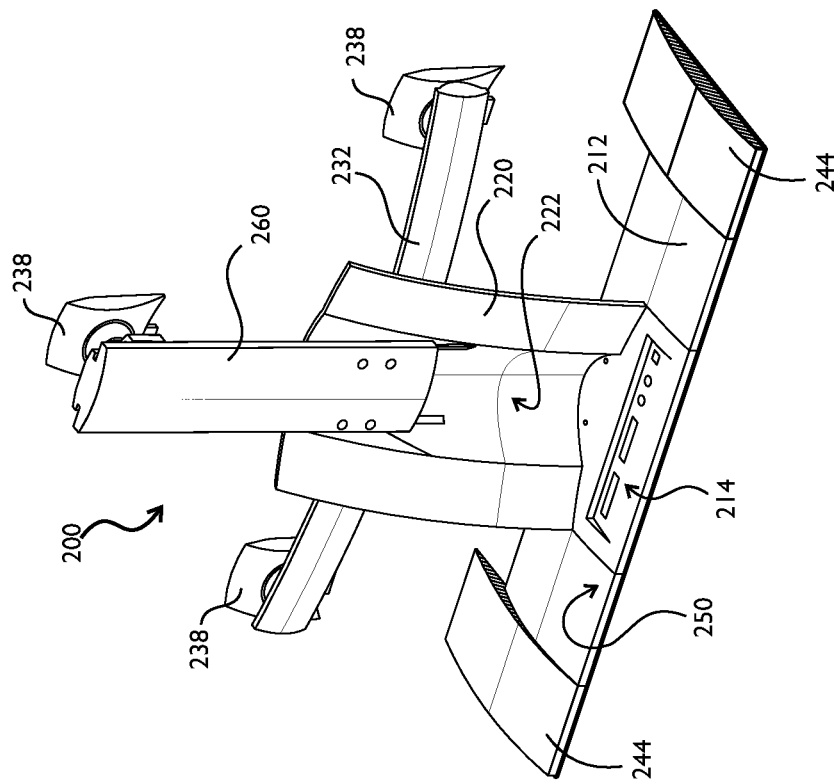
FIG. 11 is a rear perspective view of the computer system according to a third embodiment.

Turning now to FIG. 11, the present invention will be described according to a third embodiment wherein like reference numbers increased by 200 over those used in connection with system 10 will be used to designate like components. As shown, LCD support system 200 includes a vertical arm 260 mounted to the central portion 222 of upright column 220 as previously described. In addition, a slider bracket (not specifically shown) operably interconnects dual LCD support arm 232 to a lower portion of vertical arm 260. This arrangement provides a pyramid configuration in which three LCD screens may be selectively mounted to pivot brackets 238 in a triangular relationship.

Figure 12:
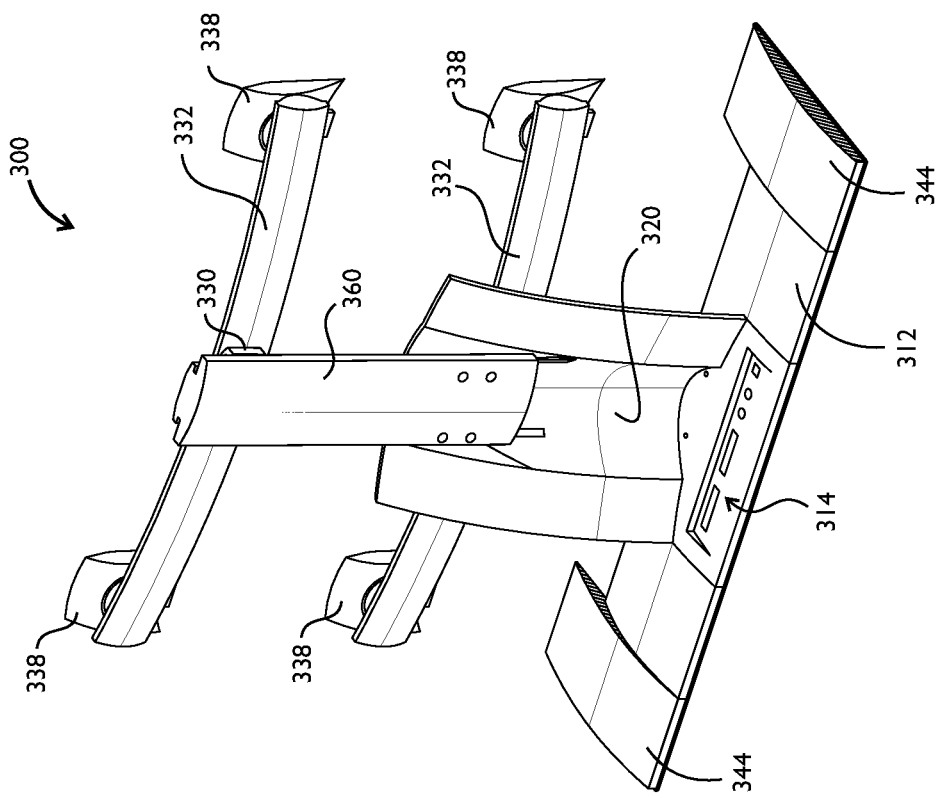
FIG. 12 is a rear perspective view of the computer system according to a fourth embodiment.

Referring now to FIG. 12, LCD support structure 300 will be described according to a fourth embodiment. Like reference numbers increased by a factor of 300 over those used in connection with system 10 will be used to designate like components. Again, both the dual arm 332 and the vertical arm 360 are mounted to column 320. In addition, a second dual arm 332 is slidably mounted on vertical arm 360 with mounting bracket 330.

Figure 13:
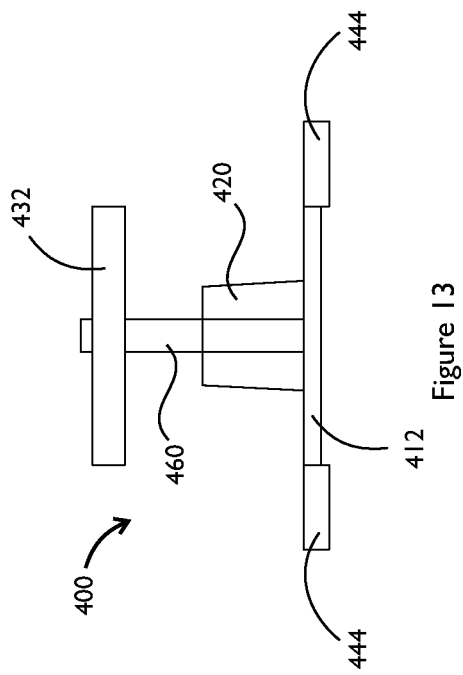
FIG. 13 is a rear perspective view of the computer system according to a fifth embodiment.
Figure 14:
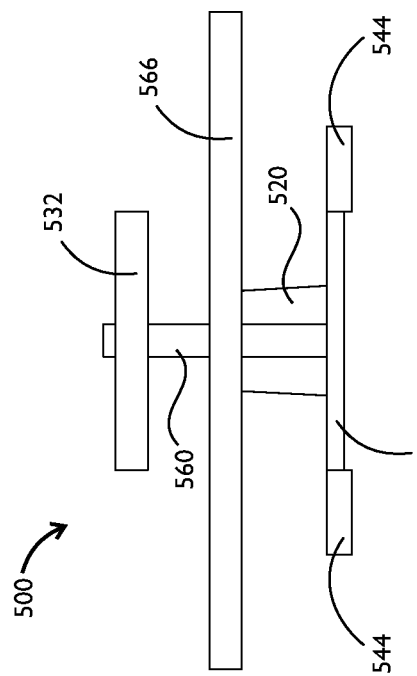
FIG. 14 is a rear perspective view of the computer system according to a sixth embodiment.

FIGS. 13 and 14 illustrate the invention according to fifth and sixth embodiments, respectively. As such, the LCD support system 400 of the fifth embodiment includes a vertical arm 460 having a dual arm 432 extending from an upper portion thereof. This configuration allows two LCD screens to be adjacently mounted in a side by side relationship as well as a third LCD screen mounted on a lower portion of the vertical arm 460. While not specifically shown, the LCD screens are preferably mounted to pivot brackets which in turn attach to the slider brackets for slidable movement along dual arm 432.

Referring to FIG. 14, LCD support system 500 of the sixth embodiment, similar to the fifth embodiment, includes a vertical arm 560 having a dual LCD support arm 532 extending from an upper portion. The lower portion of the vertical arm 560, however, includes a horizontal arm 566 mounted thereat. The horizontal arm 566 includes three mounting portions for coupling slider and pivot bracket combinations. This configuration provides two viewing screens adjacently mounted side-by-side on the dual arm 532 as well as three viewing screens adjacently mounted to each other and arranged along horizontal arm 566 under the dual arm 532.

Figure 15:
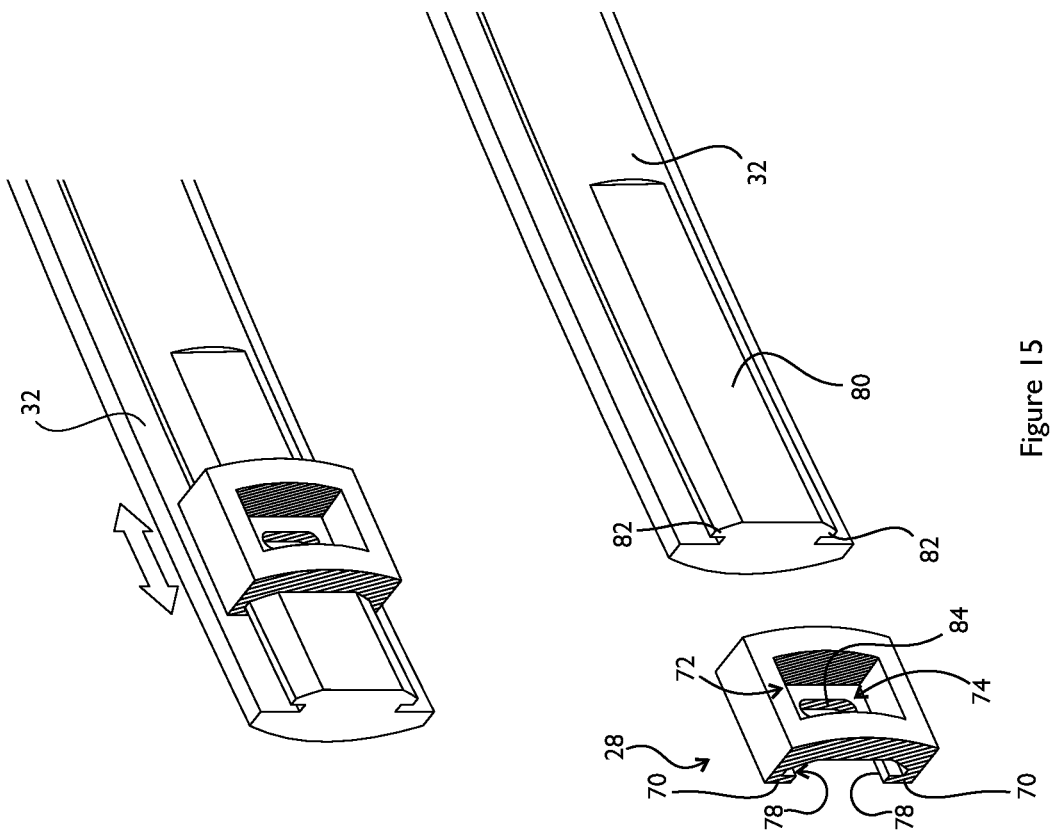
FIG. 15 is a detailed view of a slider bracket and track incorporated on the dual arm.

Referencing now FIGS. 8 and 15, the slider bracket 28 and pivot bracket 38 will be described in greater detail. Pivot bracket 38, will be described with reference to pivot bracket 138 of the second embodiment in FIG. 8. Likewise, while the description of pivot bracket 138 is described in relation to the second embodiment it is appreciated that the description applies to all pivot brackets referred to herein. In addition, while slider bracket 28 is shown operatively associated with dual arm 32 in FIG. 15, it will be apparent that the same slider bracket 28 configuration is employed for vertical arm 60 (FIGS. 8 and 9).

Slider bracket 28 generally comprises a C-shaped member defined by outwardly extending fingers 70. A front face portion 72 includes a recessed rectangular portion 74 for receiving a foot 176 of the pivot bracket 138. The geometry of slider bracket 28 allows for slidable communication along track 80. In this regard, oppositely extending rails 82 are formed along dual arm 32 for settling into arcuate portions 78 of slider bracket 28. A quick connector or similar fastening member (not shown) extends through channel 84 for engaging bore 186 formed in foot 176. Pivot bracket 138 generally comprises a ball 188 received in a socket 190 for pivotal rotation thereabout. Post 192 connects foot 176 to ball 188. A front face 152 (FIG. 10) of pivot bracket 138 includes a groove channel 154 for receiving a mounting portion (not shown) of a viewing screen (not shown). The rail and track configuration explained herein with respect to dual arm 32 is similarly employed for mounting post 24 extending from central portion 22 of column 20. It will be appreciated by those skilled in the art that slider bracket 28 and pivot bracket 138 are merely exemplary and other brackets having different geometries may be similarly employed while reaching similar results.

Figure 17:
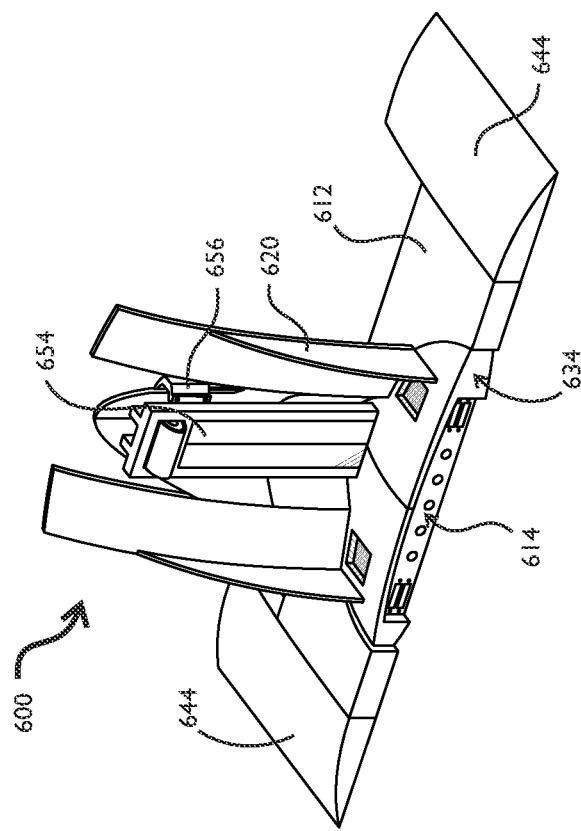
FIG. 17 is a rear perspective view of the computer system of FIG. 16 having the elevator mechanism upwardly extending from a central portion of the base.
Figure 16:
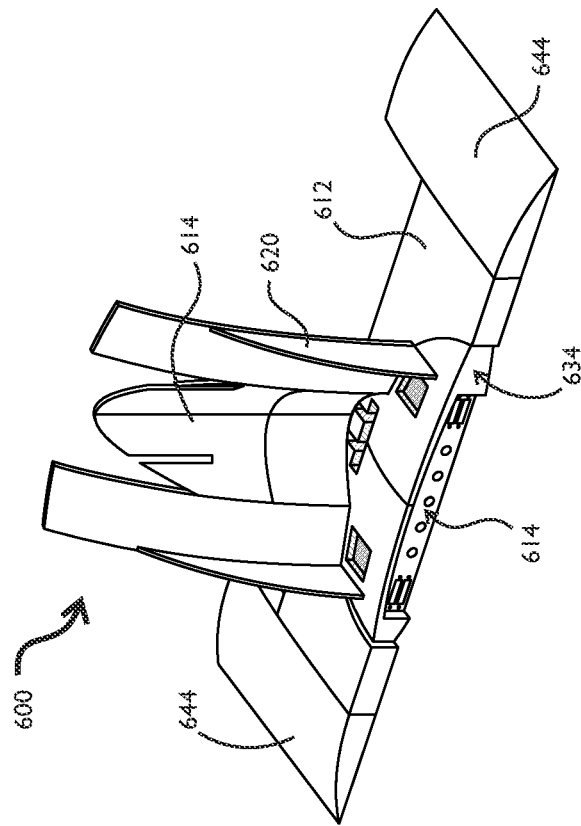
FIG. 16 is a rear perspective view of the computer system according to a seventh embodiment.

Turning now to FIGS. 16 and 17 an LCD support system 600 is provided according to a seventh embodiment wherein like reference numbers increased by 600 over these used in conjunction with system 10 will be used to designate like components. In this regard, an alternative base portion 612 and column 620 are shown having a CPU interface panel 614 operatively disposed on a vertical rear face 634. A CPU unit having vertically oriented pins and receivers (not shown) would be used to mate with interface panel 614. FIG. 17 also shows the computer system having an integrated elevator mechanism 654. The elevator mechanism 654 provides a vertical mechanical assist for adjusting the vertical orientation of a dual or vertical arm such as those discussed herein. Elevator 654 generally includes a static tower having a movable bracket 656. Bracket 656 is actuated by a rack and pinion configuration or other suitable mechanism. LCD support system 600 is also shown with foot portions 644 having an alternate geometry. It will be understood that foot portions 644 include pins and fasteners which mate with complimentary pins and fasteners disposed on base 612. In this regard, foot portions 644 may comprise non-operative structural members or working peripherals as previously described. Although elevator mechanism 654 is shown operatively associated with the seventh embodiment, it will be understood that elevator mechanism 654 may similarly be employed with the other embodiments disclosed herein.

Figure 18:
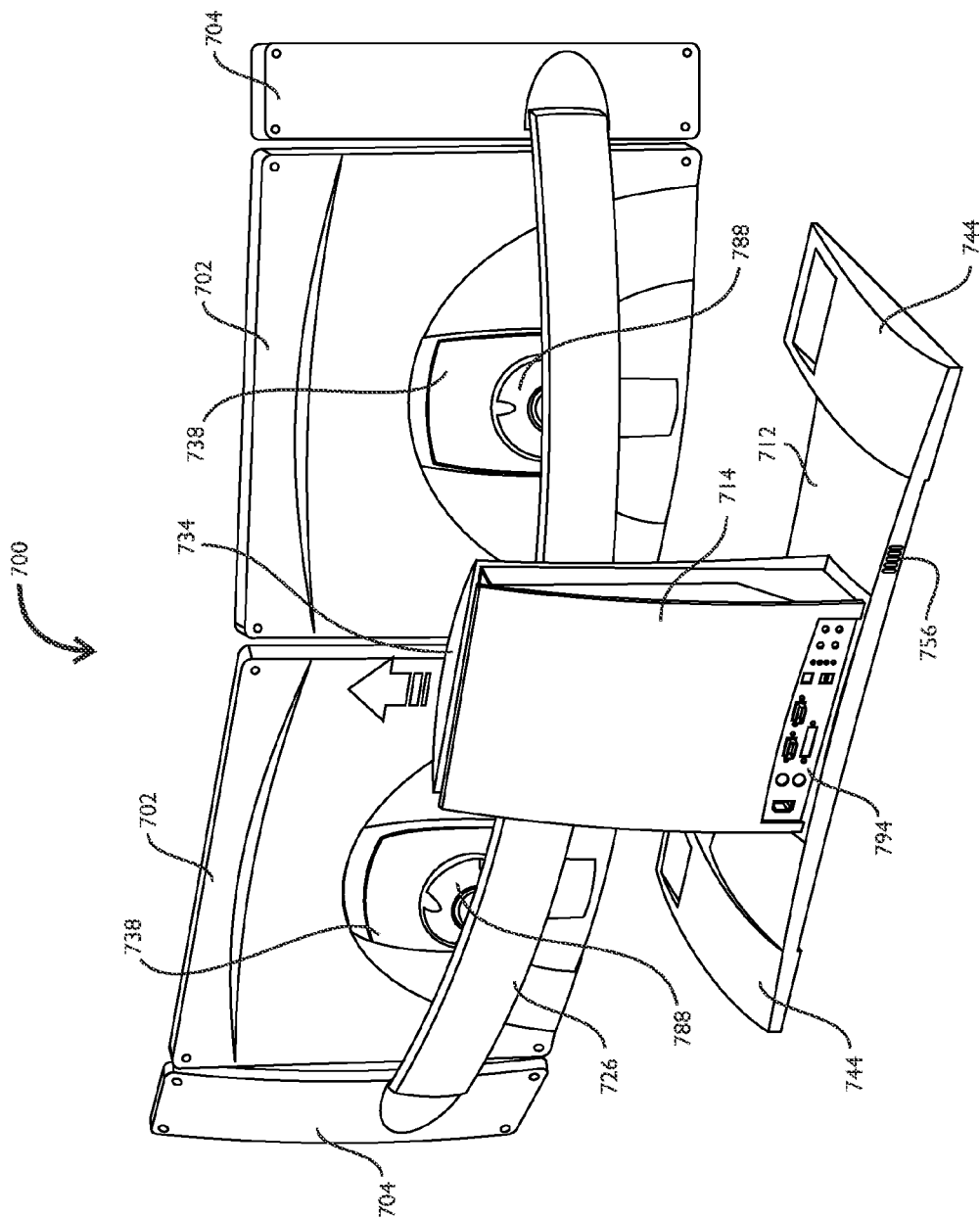
FIG. 18 is rear perspective view of the computer system according to an eighth embodiment.

Referencing FIG. 18 an LCD support system 700 according to an eighth embodiment is shown wherein like reference numbers increased by 700 over those used in conjunction with system 10 will be used to designate like components.

Support system 700 includes integral base 712 and column 714. As such, column 714 houses the main motherboard, CPU, hard drive and floppy drive. A sound card is also preferably integrated on the motherboard. Base 712 houses the main power supply and peripheral devices 744 which may include DVD, CD-ROM or ZIP drives for example. Peripherals 744 are built into base 712.

Arm 726 is laterally mounted using the aforementioned slider bracket configuration. Arm 726 accepts multiple displays 702 by way of pivot brackets 738. The necessary wiring to run power and signals from the graphics card to the displays 702 is channeled through arm 726. Speakers 704 are coupled at opposite ends of arm 726. Likewise, the necessary wiring for speakers 704 is routed through arm 726.

Column 714, which operably houses the motherboard and CPU, includes vent ports 734 integrated thereon. Connection panel 794 includes parallel and serial ports, Universal Serial Bus (USB), NIC, audio interface ports, AC and PS2 connectors. A multi-output graphics adapter is preferably integrated on the motherboard (within column 714) or may also be mounted as a separate card within arm 726. A power supply vent 756 is incorporated on base 712.

Figure 19:
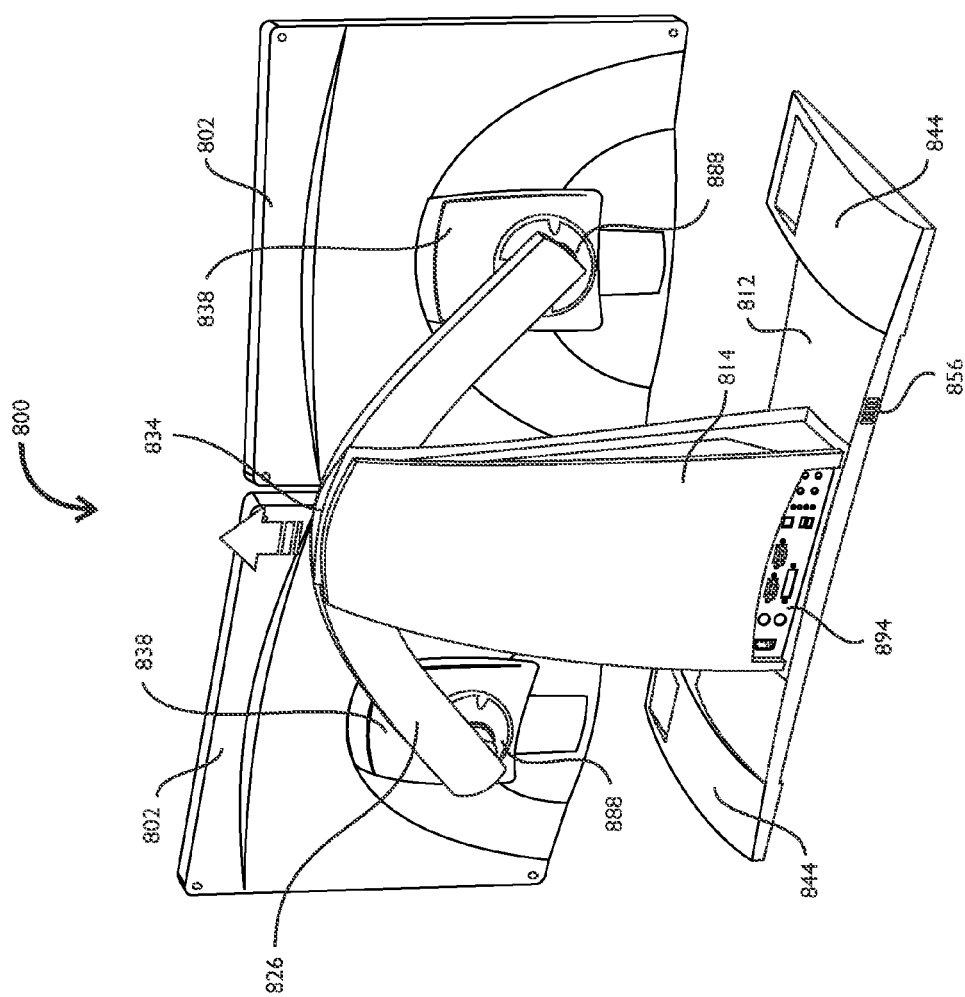
FIG. 19 is a rear perspective view of the computer system according to a ninth embodiment.

FIG. 19 illustrates an LCD support system 800 according to a ninth embodiment wherein like components in common with system 700 are designated by reference numbers increased by 100 over those used in connection with system 700. As with eighth embodiment 700, the base 812 and column 814 are an integral unit. LCD support structure 800 includes arm 826 having an arched contour. All necessary wiring for displays 802 is channeled through arm 826. Column 814 is tapered toward an upper edge and extends a sufficient amount to accommodate the vertical displacement of arm 826.

Figure 20:
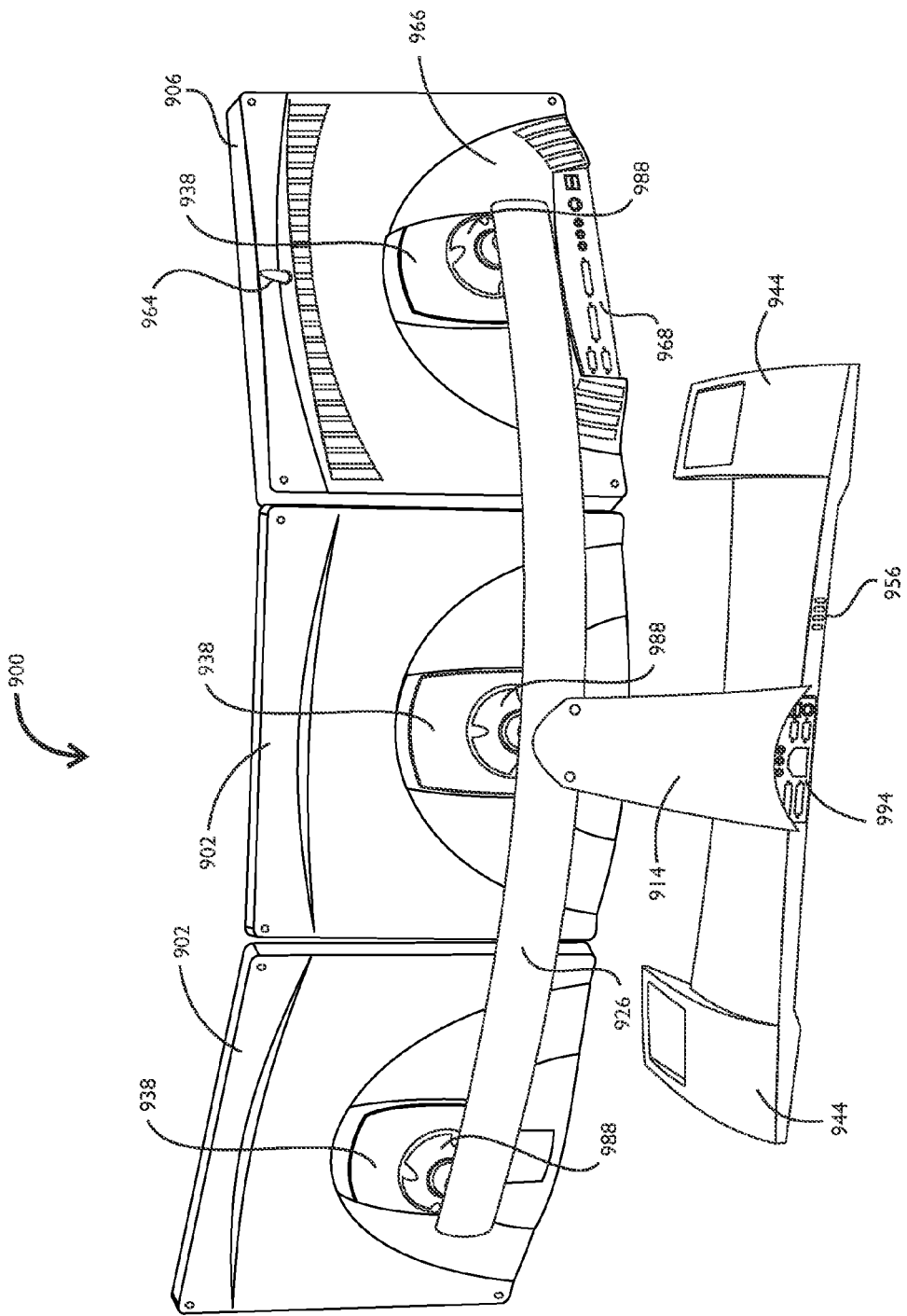
FIG. 20 is a rear perspective view of the computer system according to a tenth embodiment.

FIG. 20 illustrates an LCD support system 900 according to a ninth embodiment wherein like components in common with system 800 are designated by reference numbers increased by 100 over those used in connection with system 800. Support system 900 includes integral base 912 and column 914. Three displays are horizontally arranged across arm 926. Display 906 incorporating transmitter 964 is arranged together with two displays 902. Transmitter 964 is integrated with CPU module 966 and provides wireless networking capability to system 900. Interface panel 968 includes parallel and serial ports, USB, NIC, audio, AC and PS2 connections. Arm 926 includes an internal passage for housing all necessary cables and wires.

Figure 21:
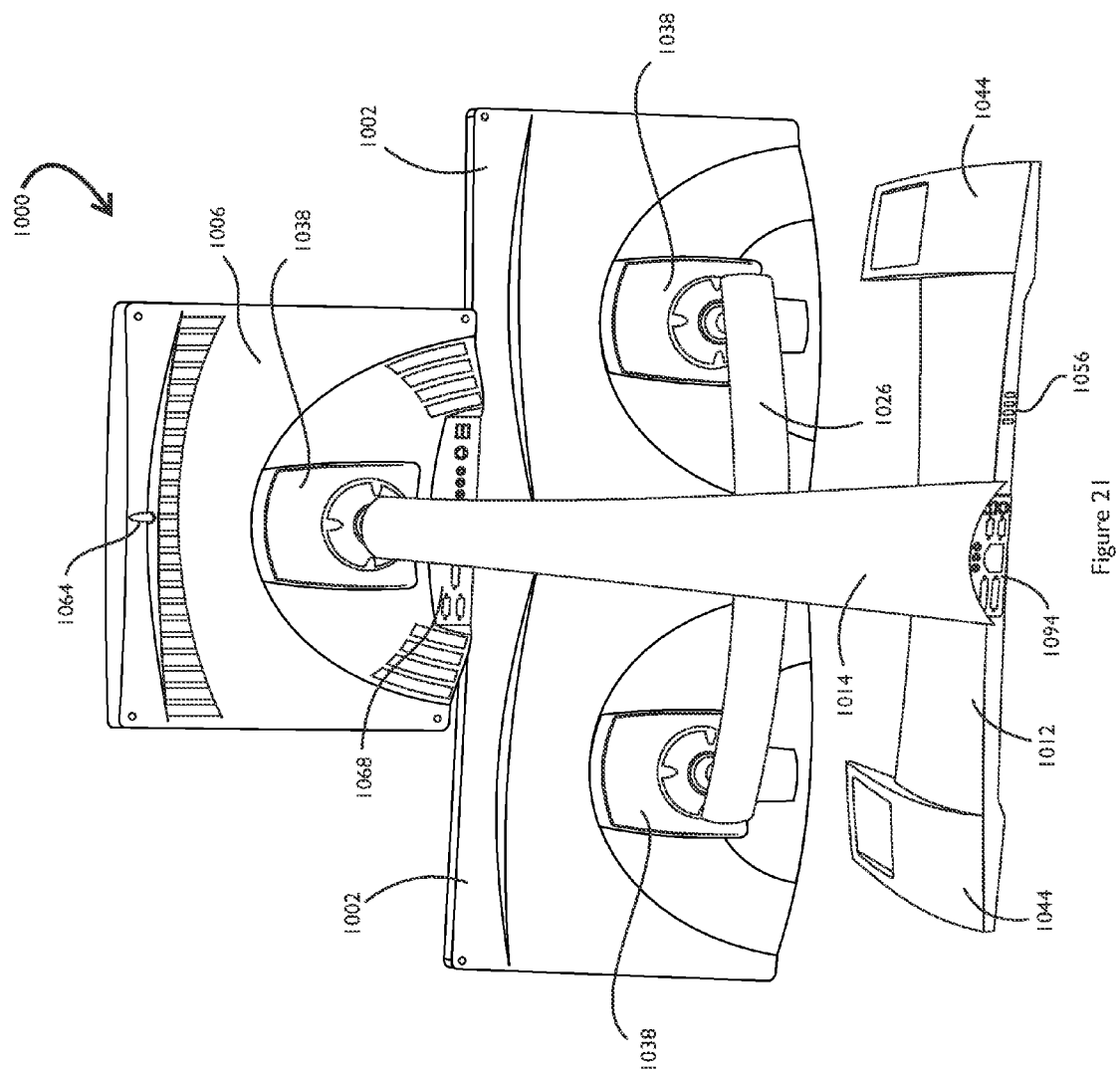
FIG. 21 is a rear perspective view of the computer system according to an eleventh embodiment.

FIG. 21 illustrates an LCD support system 1000 according to a tenth embodiment wherein like components in common with system 900 are designated by reference numbers increased by 100 over those used in connection with system 900. Three LCD displays are arranged in a triangular relationship. Display 1006 has a transmitter 1064 coupled to column 1014 by way of pivot bracket 1038 and is disposed above adjacent displays 1002.

Figure 22:
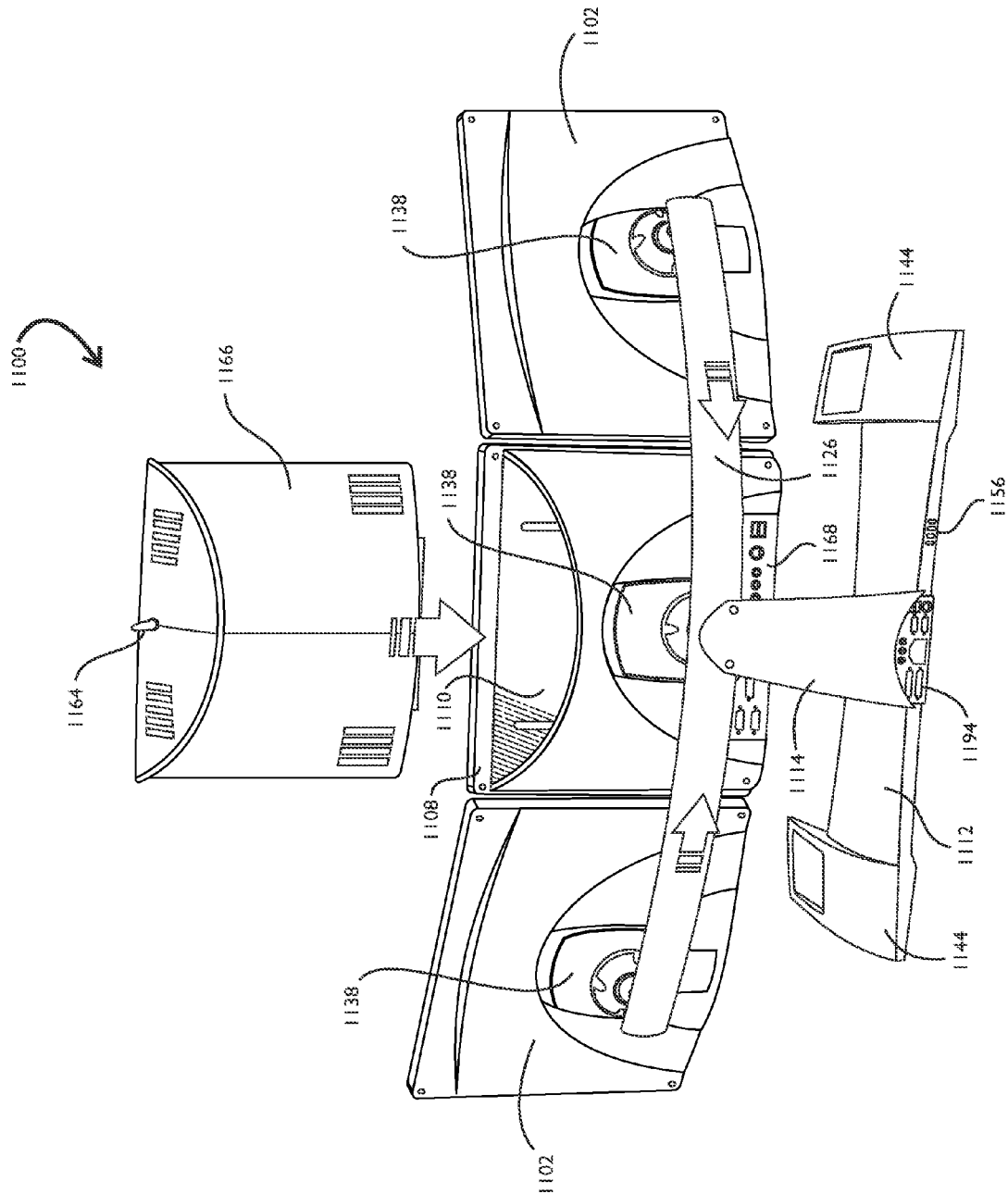
FIG. 22 is a rear perspective view of the computer system according to a twelfth embodiment having a selectively removable CPU module.

Turning now to FIG. 22 an LCD support system 1100 including removable CPU 1166 is shown. Like components in common with system 1000 are designated by reference numbers increased by 100 over those used in connection with system 1000. Display 1108 includes cradle 1110 for selectively receiving CPU 1166. In this way, CPU 1166 may be transferred from one support system to another. It should be noted that the central placement of display 1108 is merely exemplary and display 1108 may alternatively be placed on either end of arm 1126. In addition, it will be appreciated that display 1108 incorporating removable CPU 1166 may be used in conjunction with any support system described herein.

Figure 23:
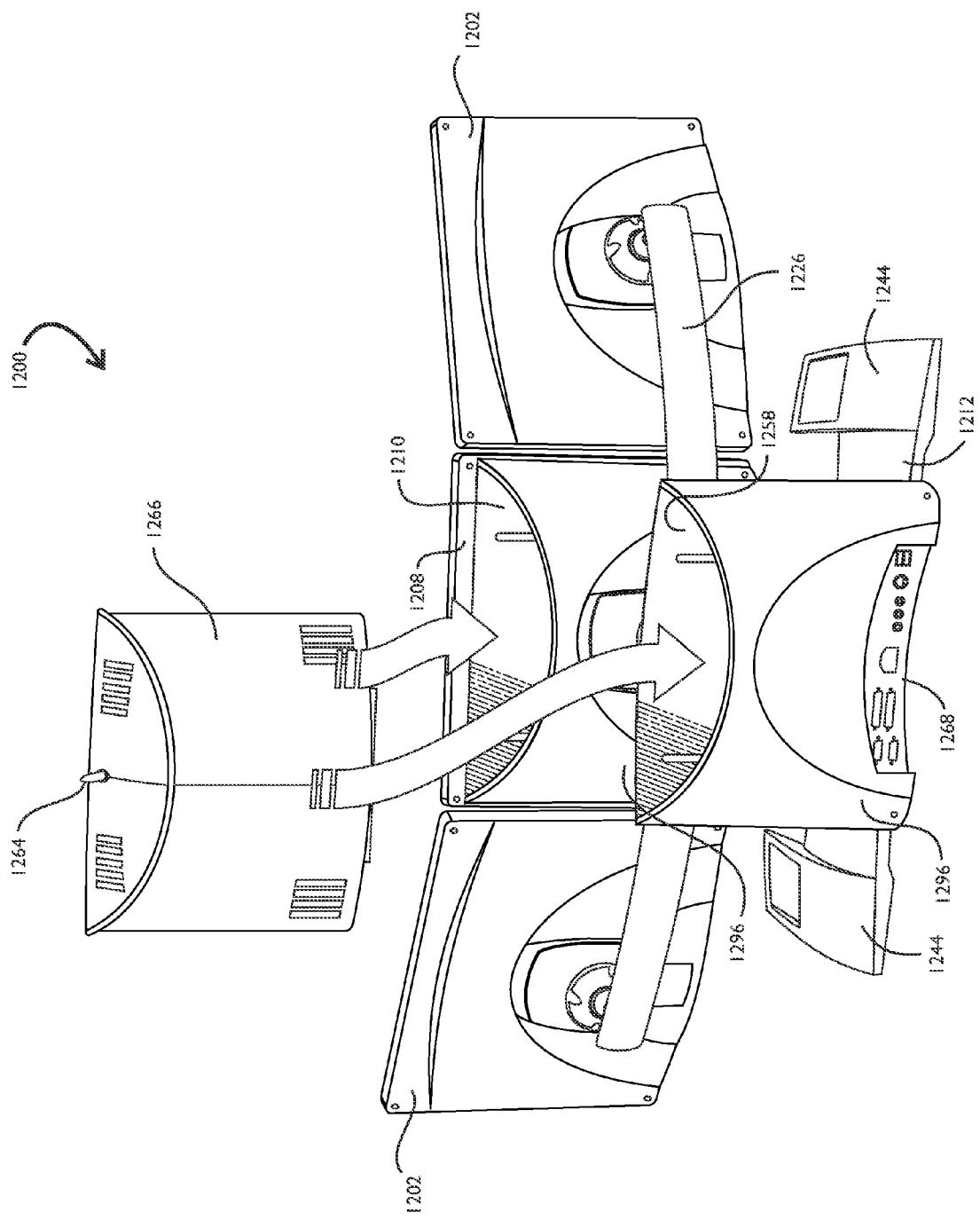
FIG. 23 is a rear perspective view of the computer system according to a thirteenth embodiment having a primary and secondary docking cradle.

FIG. 23 shows LCD support system 1200. Like components in common with system 1100 are designated by reference numbers increased by 100 over those used in connection with system 1100. Support system 1200 includes a multiport docking system 1296. Docking system 1296 includes a cradle 1210 integrated with display 1208 as well as a secondary cradle 1258. Secondary cradle 1258 is coupled to base 1212. Interface panel 1268 includes parallel and serial ports, USB, NIC, audio interface ports, AC and PS2 connectors.

Figure 24:
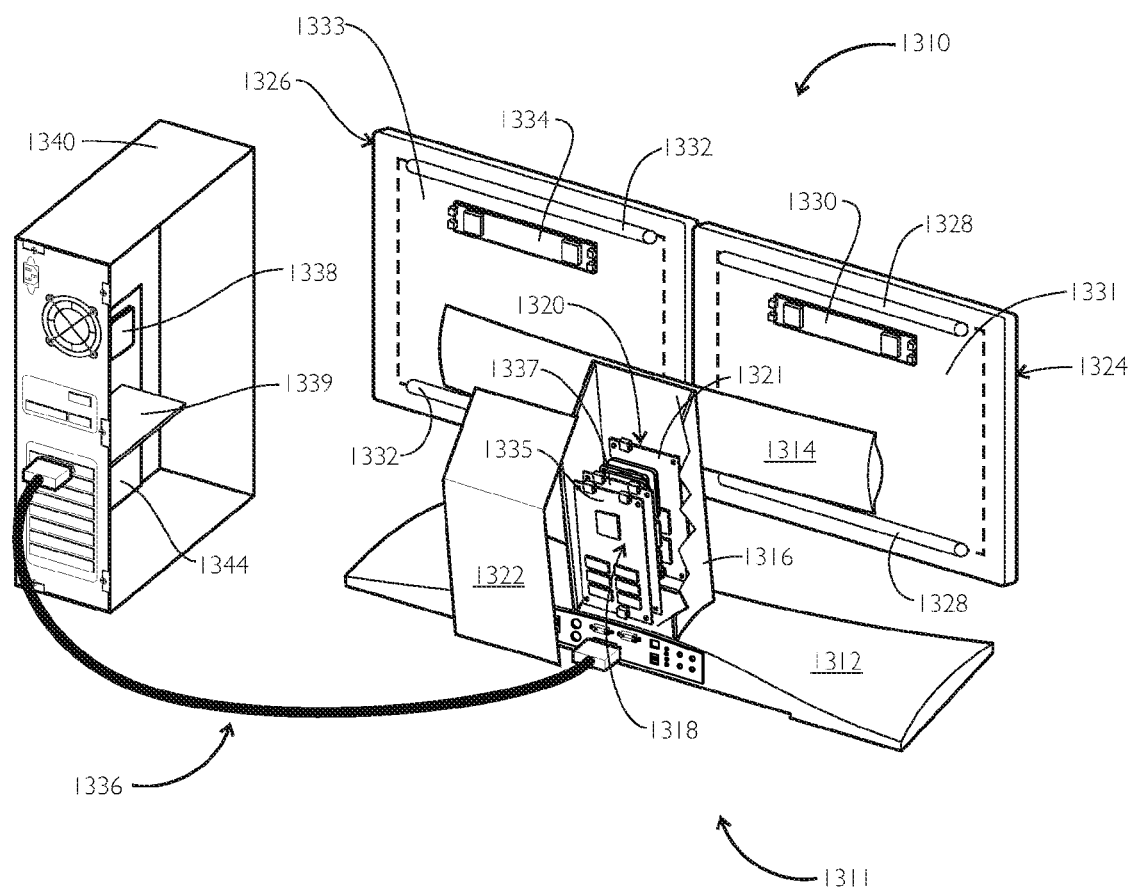
FIG. 24 is a rear view of a multi-monitor display system.

FIG. 24 shows a multi-monitor display system 1310. The system 1310 includes a support structure 1311 having a base 1312, an arm 1314, and a column 1316 that connects the base 1312 to the arm 1314. The system 1310 also includes a monitor controller assembly 1318, and a graphics assembly 1320, which are both disposed in the column 1316. The graphics assembly 1320 can include a graphics card 1321. A removable cover 1322 on the column 1316 provides access to the monitor controller assembly 1318 and the graphics assembly 1320.

The arm 1314 is adapted for supporting at least two computer monitors 1324 and 1326, such as liquid crystal display (LCD) monitors. The first computer monitor 1324 includes a first light source 1328, such as a backlight, and a first inverter 1330 to provide power thereto. The first computer monitor 1324 has a first computer screen 1331 for displaying images. Likewise, the second computer monitor 1326 includes a second light source 1332, such as a backlight, and a second inverter 1334 to provide power thereto. The second computer monitor 1326 includes a second computer screen 1333 for displaying images.

A central processor 1338 resides on a motherboard 1341 housed within a computer housing 1340, such as a computer tower. The computer housing 1340 houses at least one central processor 1338 for running various applications, such as email applications and word processing applications. The central processor can be part of a personal computer, or a laptop or notebook computer, for example. In the latter case, instead of a computer tower, a notebook housing would house the central processor.

A processor connector assembly 1336 includes a bus extender 1339. The processor connector assembly 1336 allows the central processor 1338 to electronically communicate with the graphics assembly 1320.

The monitor controller assembly 1318 can include two controller cards 1335 and 1337, one for each of the monitors 1324 and 1326. An example of a commercially available controller card is model SP-1600 from Digital View™ of Morgan Hill, Calif. The monitor controller assembly 1318 transmits timing signals, in the form of low voltage differential signaling (LVDS) for example, to electronically control the images displayed on the first computer screen 1331 of the first monitor 1324 and the second screen 1333 of the second monitor 1326. The monitor controller assembly 1318 also sends power to the screens 1331 and 1333. In addition, the monitor controller assembly 1318 supplies power and/or control signals to the backlight inverters 1330 and 1334. It should be understood that electrical cables (not shown) running from the monitor controller assembly 1318 to the monitors 1324 and 1326 are used for this purpose. For example, the cables can run up the column 1316, along the arm 1314, and into the monitors 1324 and 1326 through appropriate apertures in the arm 1314 and monitors 1324 and 1326. The removable cover 1322 can be removed to provide access to the monitor controller assembly 1318 for modification, repair or replacement.

The graphics assembly 1320, which can contain one or more graphics cards 1321, sends signals to the monitor controller assembly 1318 to produce the images via an appropriate electrical connector (not shown). The graphics card 1321 can be a two-port graphics card, one port for each of the two computer monitors 1324 and 1326. Alternatively, two single-port graphics cards can be employed, as known to those of ordinary skill in the art. The graphics assembly 1320 is adapted for sending at least one of analog RGBhv/VGA signals and digital DVI signals to the monitor controller assembly 1318 to produce the images. Other appropriate types of signals can also be used for communication between the graphics assembly and the monitor controllers, as known to those of ordinary skill.

Examples of graphics assemblies include those assemblies having a DisplayLink™ DL-3000 series chip set (such as the DL-3900 chip set) that allows a USB port to be converted into a VGA, DVI or HDMI™ port. For instance, such graphics assemblies can comprise or consist of the following commercially available graphic assemblies, or parts thereof: StarTech.com™ Ltd. video card adapter (model no. USB32HDDVII) or SIIG™, Inc. display adapter (model no. JU-H20211-S1). These adapters are used to take as input signals from a USB port (especially USB 3.0, or higher versions) associated with a computer device and output video signals, such as VGA, DVI or HDMI signals, that are then sent to the monitor controller assembly. One example for a dual-monitor display system would have the StarTech.com™ Ltd. video card adapter output DVI signals to a first monitor controller card located in and dedicated to a first of the two monitors and also output HDMI signals to a second monitor controller card located in and dedicated to a second of the two monitors. In this example, the monitor controller assembly includes these first and second monitor controller cards.

The arm 1314 of FIG. 24 is substantially horizontal and the column 1316 is substantially vertical. Other embodiments may have different geometries. For example, the multi-monitor display system can have two monitors supported by a vertical arm.

By disposing the monitor controller assembly 1318 in the column 1316, instead of disposing the monitor controller assembly within the monitors 1324 and 1326, the monitors 1324 and 1326 may be made slimmer. In addition, by disposing the graphics assembly 1320 in the column 1316, access to the graphics assembly 1320 is facilitated. In particular, unlike a typical multi-monitor display system having a graphics assembly in a computer tower, in the multi-monitor display system 1310 shown in FIG. 24, there is no need to disassemble the computer tower 1340 to gain access to the graphics assembly 1320.

An additional advantage of moving the graphics assembly outside of the computer tower is the simplification of the steps required of a user who wishes to upgrade from a single-monitor system to a multi-monitor system. In addition to acquiring the additional monitors for the upgrade, a user typically has to replace the single-monitor graphics assembly in the computer tower with a multi-monitor graphics assembly. Such a replacement is time consuming and can be costly if the user enlists the help of a technician to replace the graphics assembly. By placing the graphics assembly in the column, base, or arm, the need to replace the graphics assembly in the computer tower is obviated. In particular, a user of a single monitor system wishing to upgrade to a multi-monitor system typically buys a package that includes the monitors, and the support structure, comprising the base, column and arm, required to support the monitors. If the graphics assembly is included in the support structure, the user does not have to replace the graphics card in the computer tower. Instead, by issuing software controls, the user can disable the old single-monitor graphics assembly in the computer tower and enable the multi-monitor graphics assembly located in the purchased support structure.

In the embodiment shown in FIG. 24, the monitor controller assembly 1318 and the graphics assembly 1320 are disposed in the column 1316. Alternatively, the monitor controller assembly 1318 may be disposed in the base 1312 or the arm 1314, as described below in more detail. The graphics assembly 1320 may be disposed in the computer housing 1340 in a slot, such as a PCI slot.

Figure 25:
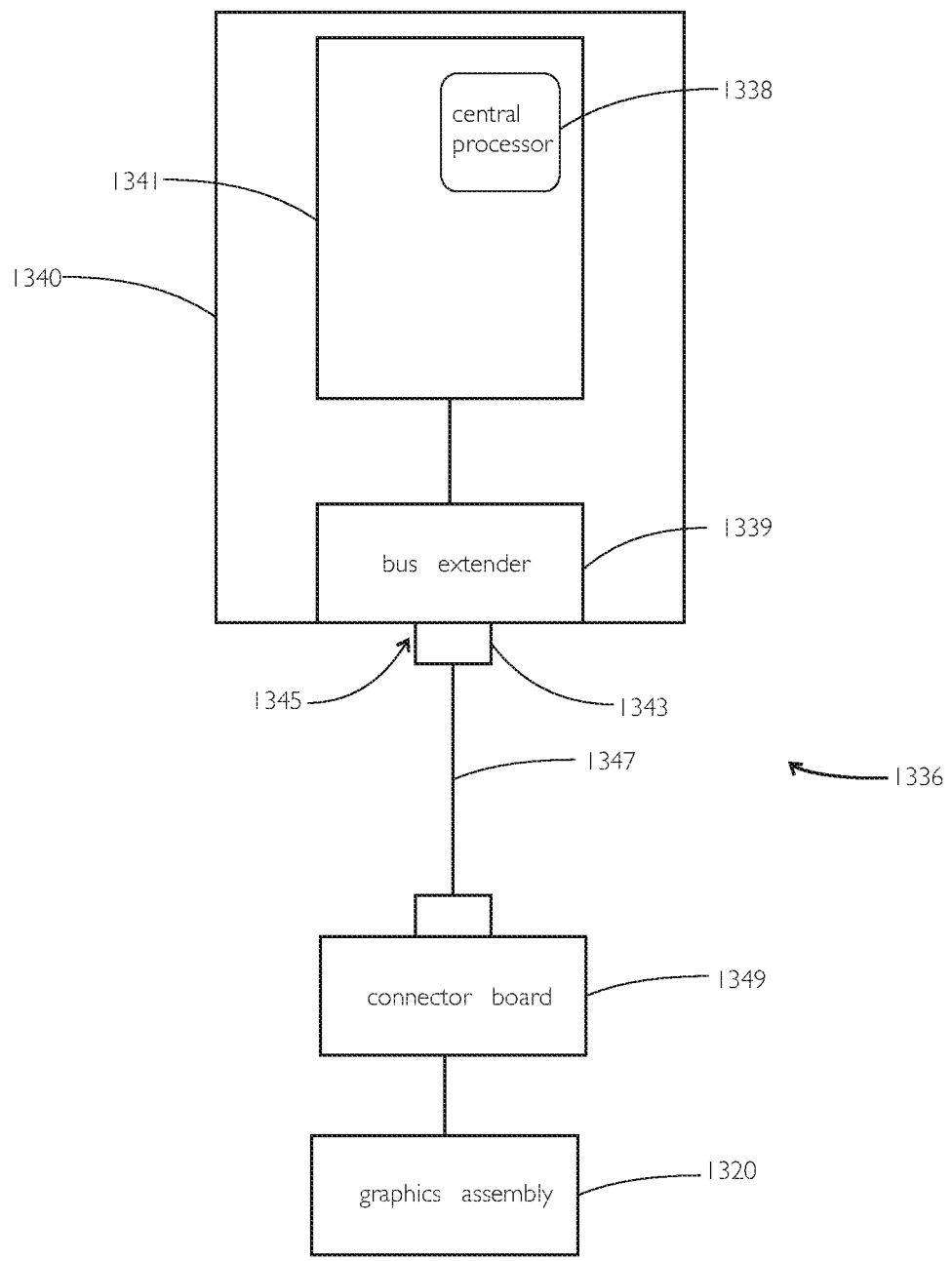
FIG. 25 is a block diagram showing more detail of an electrical connector assembly of FIG. 24.

FIG. 25 is a block diagram showing more detail of the processor connector assembly 1336 of FIG. 24. The processor connector assembly 1336 includes the bus extender 1339 that is connected to the motherboard 1341 containing the central processor 1338 located in the computer housing 1340. The bus extender 1341 includes a bus extender port 1343 that is accessible via an opening 1345 in the computer housing 1340. The processor connector assembly 1336 further includes a bus extender cable 1347 and a connector board 1349. The bus extender cable 1347 is connected to the extender port 1343 at one end, and at an opposite end to the connector board 1349. The connector board 1349 is an adapter that allows the bus extender cable 1347 to connect to the graphics assembly 1320. In one embodiment, the connector board 1349 contains just passive elements. In another embodiment, the connector board 1349 may also contain active elements, such as buffering elements. The bus extender cable 1347 transports digital signals, such as PCI signals, from the bus extender port 1343 to the connector board 1349.

Figure 26:
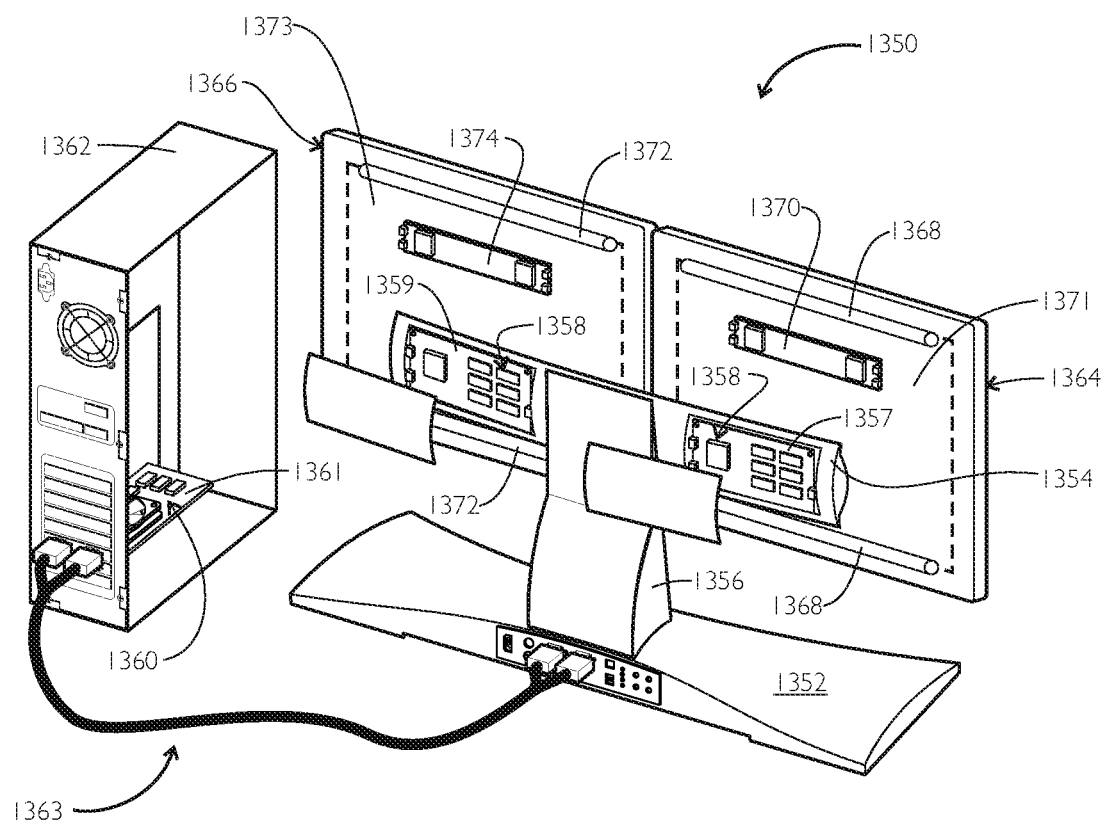
FIG. 26 is a rear view of another embodiment of a multi-monitor display system.

FIG. 26 shows a rear view of another embodiment of a multi-monitor display system 1350. The system 1350 includes a base 1352 and an arm 1354. A column 1356 connects the base 1352 to the arm 1354. The system 1350 also includes a monitor controller assembly 1358, which includes two monitor controller cards 1357 and 1359. The monitor controller assembly 1358 is disposed in the arm 1354. The system 1350 also includes a graphics assembly 1360, which includes a two-port graphics card 1361, disposed in a computer housing 1362, such as a computer tower.

The arm 1354 is adapted for supporting at least two computer monitors 1364 and 1366, such as liquid crystal display (LCD) monitors. The first computer monitor 1364 includes a first light source 1368, such as a backlight, and a first inverter 1370 to provide power thereto. The first computer monitor 1364 has a first computer screen 1371 for displaying images. Likewise, the second computer monitor 1366 includes a second light source 1372, such as a backlight, and a second inverter 1374 to provide power thereto. The second computer monitor 1366 includes a second computer screen 1373 for displaying images.

The monitor controller assembly 1358 includes the first monitor controller card 1357 associated with the monitor 1364, and the second monitor controller card 1359 associated with the monitor 1366. More generally, if the multi-monitor display system 1350 were to have N monitors, then the system 1350 would have N monitor controller cards, one for each monitor.

The first monitor controller card 1357 is disposed in the arm 1354 behind the monitor 1364 associated therewith. Likewise, the second monitor controller card 1359 is disposed in the arm 1354 behind the monitor 1366 associated therewith.

The monitor controller assembly 1358 transmits control signals, in the form of low voltage differential signaling (LVDS) for example, to electronically control the images displayed on the first screen 1371 of the first monitor 1364 and the second screen 1373 of the second monitor 1366, as described above. In addition, the monitor controller assembly 1358 supplies power and/or control signals to the inverters 1370 and 1374. Two removable covers 1380 and 1381 on the arm 1354 can be removed to provide access to the monitor controller cards 1357 and 1359, respectively, for modification, repair or replacement.

The graphics assembly 1360 is in electronic communication with the monitor controller assembly 1358 via electrical connectors 1363. The graphics assembly 1360 sends signals to the monitor controller assembly 1358 to produce images. The graphics assembly 1360 is adapted for sending at least one of analog RGBhv/VGA signals and digital DVI signals, or any other appropriate video signals, to the monitor controller assembly 1358 to produce the images.

The monitor controller assembly 1358 is in electrical communication with the screens 1371 and 1373 via appropriate electrical connectors (not shown) that are capable of carrying low voltage differential signaling (LVDS). The electrical connectors can include cables that run from the monitor controller assembly 1358 in the arm 1354 to electrical components in the monitors 1364 and 1366 that help produce images on the screens 1371 and 1373. Instead of LVDS, other types of appropriate signaling may also be used, as known to those of ordinary skill in the art.

It should be understood that in a different embodiment, the monitor controller assembly might also be disposed in the base 1352, instead of the arm 1354. Similarly, instead of the computer tower 1362, the graphics assembly may be disposed in any one of the base, the arm and the column.

Figure 27:
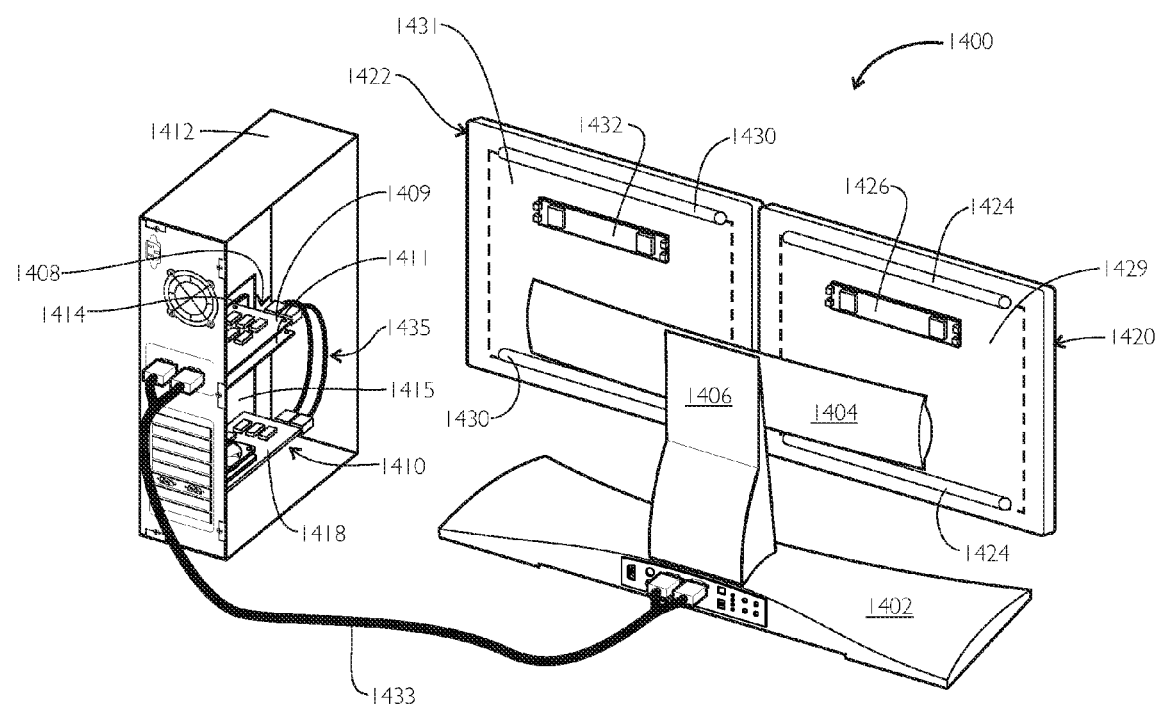
FIG. 27 is a rear view of another embodiment of a multi-monitor display system.

FIG. 27 shows another embodiment of a multi-monitor display system 1400. The system 1400 includes a base 1402 and an arm 1404. A column 1406 connects the base 1402 to the arm 1404. The system 1400 also includes a monitor controller assembly 1408, which includes two controller cards 1409 and 1411, and a graphics assembly 1410, which includes a two-port graphics card 1418. Instead, two single-port graphics cards could be used. The monitor controller assembly 1408 and the graphics assembly are both disposed in a computer housing 1412. Also disposed in the computer housing 1412 is at least one central processor 1414 residing on a motherboard 1415. The graphics card 1418 can reside in a slot (not shown), such as an AGP slot or a PCI slot, inside the computer housing 1412.

The arm 1404 is adapted for supporting at least two computer monitors 1420 and 1422, such as liquid crystal display (LCD) monitors. The first computer monitor 1420 includes a first light source 1424, such as a backlight, and a first inverter 1426 to provide power thereto. The first computer monitor 1420 has a first computer screen 1429 for displaying images. Likewise, the second computer monitor 1422 includes a second light source 1430, such as a backlight, and a second inverter 1432 to provide power thereto. The second computer monitor 1422 includes a second computer screen 1431 for displaying images.

The monitor controller assembly 1408 electronically controls the images displayed on the first screen 1429 of the first monitors 1420 and the second screen 1431 of the second monitor 1422. The monitor controller assembly 1408 transmits control signals, in the form of low voltage differential signaling (LVDS) for example, to electronically control the monitors 1420 and 1422. In addition, the monitor controller assembly 1408 supplies power and/or control signals to the inverters 1426 and 1432. For these purposes, a controller connector assembly 1433 is provided to allow the monitor controller assembly 1408 to be in electronic communication with the monitors 1420 and 1422. The controller connector assembly 1433 includes cables for sending LVDS, and for sending power to the screens 1429 and 1431, as well as cables for sending control signals and/or power to the inverters 1426 and 1432.

The graphics assembly 1410 sends signals to the monitor controller assembly 1408 to produce the images via electrical cables 1435. The graphics assembly 1410 is adapted for sending at least one of analog RGBhv/VGA signals and digital DVI signals to the monitor controller assembly 1408 to produce the images. Other appropriate signals, known to those of ordinary skill, may also be used.

Advantageously, by disposing the monitor controller assembly 1408 in the computer tower 1412, instead of in the monitors 1420 and 1422, the monitors are lighter and slimmer.

Figure 28:
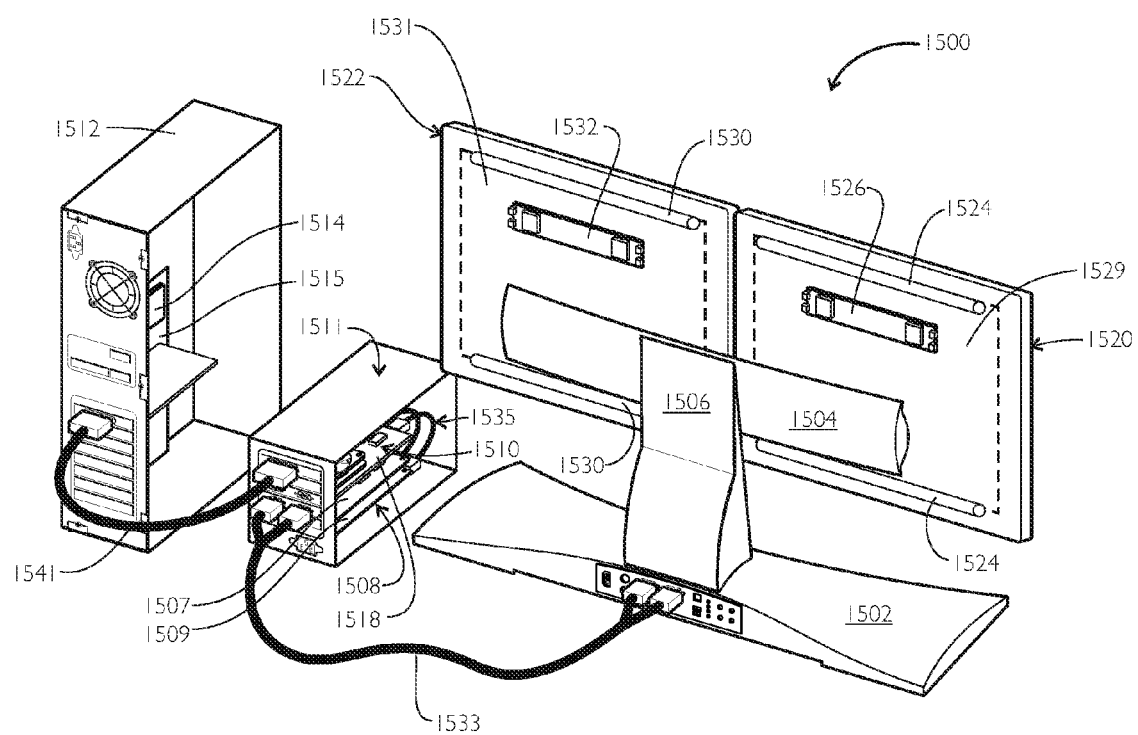
FIG. 28 is a rear view of yet another embodiment of a multi-monitor display system.

FIG. 28 shows another embodiment of a multi-monitor display system 1500. The system 1500 includes a base 1502 and an arm 1504. A column 1506 connects the base 1502 to the arm 1504. The system 1500 also includes a monitor controller assembly 1508, which includes two monitor controller cards 1507 and 1509, and a graphics assembly 1510. The monitor controller assembly 1508 and the graphics assembly 1510 are disposed in a graphics/controller module 1511. A computer housing 1512, such as a computer tower, includes at least one central processor 1514 disposed on a motherboard 1515. The graphics assembly 1510 includes a graphics card 1518. The central processor 1514 is in communication with the graphics assembly 1510 via a processor connector assembly 1541, such as the processor connector assembly 1336 shown in FIG. 25.

The arm 1504 is adapted for supporting at least two computer monitors 1520 and 1522, such as liquid crystal display (LCD) monitors. The first computer monitor 1520 includes a first light source 1524, such as a backlight, and a first inverter 1526 to provide power thereto. The first computer monitor 1520 has a first computer screen 1529 for displaying images. Likewise, the second computer monitor 1522 includes a second light source 1530, such as a backlight, and a second inverter 1532 to provide power thereto. The second computer monitor 1522 includes a second computer screen 1531 for displaying images.

The monitor controller assembly 1508 electronically controls the images displayed on the first screen 1529 of the first monitors 1520 and the second screen 1531 of the second monitor 1522. The monitor controller assembly 1508 transmits control signals, in the form of low voltage differential signaling (LVDS) for example, to electronically control the monitors 1520 and 1522. The monitor controller assembly 1508 also supplies power to the screens 1529 and 1521. In addition, the monitor controller assembly 1508 supplies power and/or control signals to the inverters 1526 and 1532. For these purposes, a controller connector assembly 1533 is provided, which includes electrical cables to allow the monitor controller assembly 1508 to be in electronic communication with the monitors 1520 and 1522.

The graphics assembly 1510 sends signals to the monitor controller assembly 1508 to produce the images via electrical connectors 1535. The graphics assembly 1510 is adapted for sending at least one of analog RGBhv/VGA signals and digital DVI signals, or any other appropriate video signals, to the monitor controller assembly 1508 to produce the images.

The graphics/controller module 1511 can include a housing having appropriate ports for the processor connector assembly 1541 and the controller connector assembly 1533. The graphics/controller module 1511 can include a cover or lid (the lid is shown removed in FIG. 28 to show contents) that is removable to access the monitor controller assembly 1508 and the graphics assembly 1510. If necessary, a separate power cord can be supplied to the module 1511.

The inventor contemplates that the graphics and controller assemblies can reside in various locations. Specifically, if B, C, A, M, H and G denote the base, the column, the arm, the monitors, the computer housing and the graphics/controller module, respectively, then the following embodiments are possible: {BB}, {BC}, {BA}, {BM}, {BH}, {BG}, {CB}, {CC}, {CA}, {CM}, {CH}, {CG}, {AB}, {AC}, {AA}, {AM}, {AH}, {AG}, {MB},{MC},{MA},{MM}, {MH}, {MG}, {HB},{HC},{HA},{HM}, {HH}, {HG}, {GB}, {GC}, {GA}, {GM}, {GH} and {GG}, where the first position indicates the location of the graphics assembly, and the second position indicates the location of the monitor controller assembly. For example, {HC} signifies the embodiment in which the graphics assembly is located in the computer housing and the monitor controller assembly is located in the column. It should be understood that in the embodiments containing "M," the assembly is located in one or more monitors. Thus, {MB} signifies the embodiment in which the monitor controller assembly is in the base, and the graphics assembly is in one or more of the monitors.

It is also contemplated that the assemblies can be spread out over more than one component. For example, a first part of the graphics assembly can be located in the base, and a second part can be located in the column.

While embodiments of this invention have been illustrated in the accompanying drawings and described above, it will be evident to those skilled in the art that changes and modifications may be made therein without departing from the essence of this invention. For example, although FIGS. 24, 26, 27 and 28 show two monitors, it should be understood that this is only in the interest of clarity. In particular, the principles of the present invention can be applied to an N-screen display system, where N is greater than two, such as a three-screen display system, or a four-screen display system, mutatis mutandis. Thus, in a three-screen display system, a triple-port graphics card, three single-port graphics card, or a single port graphics card and a two-port graphics card can be used. In addition, three controller cards would be used in a triple-screen display system.

It will be appreciated that many of the preferred embodiments described herein completely eliminate or substantially reduce the need for any external electrical cabling for coupling various subcomponents making up the various LCD support systems, as well as the need for external power supplies. The preferred embodiments thus all serve to provide a very uncluttered LCD support system which has built in to it all the connectors necessary to effect coupling of the various subcomponents to one another. Also, while reference has been made throughout to LCD screens, it will be appreciated that the support system disclosed herein is equally well suited to be used with virtually any type of flat panel-type display screen, or other form of display screen, such as DLP, plasma and OLED display screens/monitors.

In addition, the inventor contemplates embodiments, consistent with the present invention, in which there is no base. For example, in a floor, wall or ceiling mounted display system, a column may be directly connected to a floor, wall or ceiling to support the arm. Thus, a column that is directly connected to a floor, wall or ceiling can make an angle therewith that varies from zero degrees (i.e., vertically displaced, extending upwards, as might be applicable when the column is connected to a floor) to 180 degrees (i.e., vertically displaced, extending downwards, as might be applicable when the column is connected to a ceiling). The monitor controller assembly and/or the graphics assembly can be located in the floor, wall or ceiling.

While the invention has been described in the specification and illustrated in the drawings with reference to various preferred embodiments, it will be understood by those skilled in the art that various changes may be made and equivalents may be substituted for elements thereof without departing from the scope of the invention as defined in the claims For example, the integral base and column may be incorporated with any of the computer systems disclosed herein Therefore, it is intended that the invention not be limited to the particular embodiments illustrated by the drawings and described in the specification as the best mode presently contemplated for carrying out the invention, but that the invention will include any embodiments falling within the present description and the appended claims.

What is claimed is:

1. A multi-monitor display system for use with a central processor disposed within a computer housing, the system comprising:
    a computer housing for housing a central processor;
    an arm adapted for supporting a plurality of monitors having display screens;
    a column for supporting the arm;
    a base connected to the column;
    a monitor controller assembly for electronically controlling images displayed on the screens; and
    a graphics assembly for receiving signals from the central processor and for sending video signals to the monitor controller assembly to produce the images, wherein at least one of the monitor controller assembly and the graphics assembly is disposed in at least one of the base, the column and the arm and wherein the at least one of the base, the column and the arm are devoid of the computer housing containing the central processor.

2. The system of claim 1, wherein the at least one of the base, the column and the arm includes a cover that can be opened to access the at least one of the monitor controller assembly and the graphics assembly.

3. The system of claim 1, wherein the monitor controller assembly includes a plurality of monitor controller cards, each card associated with one of the monitors.

4. The system of claim 3, wherein the plurality of monitor controller cards are disposed in the arm, such that behind each monitor there is the monitor controller card associated therewith.

5. The system of claim 1, wherein the monitors are one of liquid crystal display, DLP, plasma and OLED monitors.

6. The system of claim 1, wherein the monitor controller assembly transmits timing signals to the monitors for electronically controlling the images, the timing signals transmitted using low voltage differential signaling.

7. The system of claim 1, wherein each monitor includes a light source, and an inverter to supply voltage thereto, and wherein the monitor controller assembly transmits power and control signals to the inverter.

8. The system of claim 1, wherein the graphics assembly is adapted for sending at least one of analog RGBhv/VGA signals and digital DVI signals to the monitor controller assembly to produce the images.

9. The system of claim 8, wherein the graphics assembly and the monitor controller assembly are disposed proximal to one another in a graphics/controller module.

10. The system of claim 1, wherein the graphics assembly inputs signals from a USB port associated with the central processor and outputs the video signals.

11. A multi-monitor display system for use with a central processor disposed within a computer housing, the system comprising:
- a computer housing for housing a central processor,
- an arm adapted for supporting a plurality of monitors having display screens;
- a column for supporting the arm;
- a base connected to the column;
- a monitor controller assembly for electronically controlling images displayed on the screens; and
- a graphics assembly for receiving signals from the central processor and for sending signals to the monitor controller assembly to produce the images, wherein the graphics assembly is disposed in one or more of the monitors and wherein the plurality of monitors are devoid of the computer housing containing the central processor.

12. The system of claim 11, wherein the graphics assembly is adapted for sending at least one of analog RGBhv/VGA signals and digital DVI signals to the monitor controller assembly to produce the images.

13. The system of claim 11, wherein the graphics assembly inputs signals from a USB port associated, with the central processor and outputs the video signals.

* * * * *